(12) United States Patent
Sharma et al.

(10) Patent No.: US 12,743,794 B2
(45) Date of Patent: Sep. 22, 2026

(54) NORMALIZED CROSS-CORRELATION BASED EDGE TRACKING

(71) Applicant: QUALCOMM Incorporated, San Diego, CA (US)

(72) Inventors: Chayan Sharma, Jabalpur (IN); Ajit Deepak Gupte, Bangalore (IN); Gerhard Reitmayr, Del Mar, CA (US); Pushkar Gorur Sheshagiri, Bengaluru (IN); Tom Edward Botterill, San Diego, CA (US); Bhargava Venkata Chintalapati, Hyderabad (IN); Aashish Kumar, Bangalore (IN); Poorna Hima Vamsi Anumula, Vinukonda (IN)

(73) Assignee: QUALCOMM Incorporated, San Diego, CA (US)

( * ) Notice: Subject to any disclaimer, the term of this patent is extended or adjusted under 35 U.S.C. 154(b) by 179 days.

(21) Appl. No.: 18/930,750

(22) Filed: Oct. 29, 2024

(65) Prior Publication Data

US 2026/0120294 A1 Apr. 30, 2026

(51) Int. Cl.

| | |
|---|---|
| ***G06T 7/246*** | (2017.01) |
| ***G06T 7/13*** | (2017.01) |
| ***G06T 7/50*** | (2017.01) |
| ***G06T 7/73*** | (2017.01) |

(52) U.S. Cl.

CPC ................ *G06T 7/248* (2017.01); *G06T 7/13* (2017.01); *G06T 7/50* (2017.01); *G06T 7/74* (2017.01)

(58) Field of Classification Search

CPC .. G06T 7/248; G06T 7/74; G06T 7/50; G06T 7/13

See application file for complete search history.

(56) References Cited

U.S. PATENT DOCUMENTS

| | | | | |
|---|---|---|---|---|
| 2016/0165134 | A1* | 6/2016 | Lelescu | G06T 3/4069 348/218.1 |
| 2021/0334995 | A1* | 10/2021 | Spence | G06T 7/60 |
| 2025/0278827 | A1* | 9/2025 | Zhang | H04N 1/6047 |

* cited by examiner

*Primary Examiner* — Ming Shui

(74) *Attorney, Agent, or Firm* — Polsinelli LLP/QUALCOMM Incorporated

(57) ABSTRACT

Techniques and systems are provided for edge detection is provided. The process can include obtaining a depth information and location information for a point detected in an obtained image; predicting a pose for the point based on the depth information, location information, and information about movement of a device; determining a search range and a search direction based on the location information and predicted pose; performing normalized cross correlation (NCC) matching between pixels of the obtained image based on the determined search range and search direction to identify an edge; and outputting a location of the edge.

19 Claims, 14 Drawing Sheets

NORMALIZED CROSS-CORRELATION BASED EDGE TRACKING

FIELD

This application is related to locating a device (e.g., localization) in an environment. For example, aspects of the application relate to systems and techniques normalized cross-correlation (NCC) based edge tracking, such as for simultaneous localization and mapping (SLAM) systems.

BACKGROUND

An extended reality (XR) (e.g., virtual reality, augmented reality, mixed reality) system can provide a user with a virtual experience by immersing the user in a completely virtual environment (made up of virtual content) and/or can provide the user with an augmented or mixed reality experience by combining a real-world or physical environment with a virtual environment.

One example use case for XR content that provides virtual, augmented, or mixed reality to users is to present a user with a "metaverse" experience. The metaverse is essentially a virtual universe that includes one or more three-dimensional (3D) virtual worlds. For example, a metaverse virtual environment may allow a user to virtually interact with other users (e.g., in a social setting, in a virtual meeting, etc.), to virtually shop for goods, services, property, or other item, to play computer games, and/or to experience other services.

In some cases, a user may be represented in a virtual environment (e.g., a metaverse virtual environment) as a virtual representation of the user, sometimes referred to as an avatar. To provide a more immersive experience, the avatar may be animated to reflect movement of the user. That is, the avatar may be animated based on how the user is moving. Techniques to improve how movements of the user are tracked may be useful.

SUMMARY

Systems and techniques are described herein for displaying augmented reality enhanced media content. For example, aspects of the present disclosure relate to systems and techniques for reducing an effective latency by multi-sampling poses during reprojection. The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary presents certain concepts relating to one or more aspects relating to the mechanisms disclosed herein in a simplified form to precede the detailed description presented below.

Systems and techniques are described for an apparatus for edge detection is provided. The apparatus includes at least one memory and at least one processor coupled to the at least one memory. The at least one processor is configured to: obtain a depth information and location information for a point detected in an obtained image; predict a pose for the point based on the depth information, location information, and information about movement of the apparatus; determine a search range and a search direction based on the location information and predicted pose; perform normalized cross correlation (NCC) matching between pixels of the obtained image based on the determined search range and search direction to identify an edge; and output a location of the edge.

A method for edge detection is provided. The method includes: obtaining a depth information and location information for a point detected in an obtained image; predicting a pose for the point based on the depth information, location information, and information about movement of a device; determining a search range and a search direction based on the location information and predicted pose; performing normalized cross correlation (NCC) matching between pixels of the obtained image based on the determined search range and search direction to identify an edge; and outputting a location of the edge.

A non-transitory computer-readable medium having stored thereon instructions is provided. The instructions, when executed by at least one processor, cause the at least one processor to: obtain a depth information and location information for a point detected in an obtained image; predict a pose for the point based on the depth information, location information, and information about movement of the apparatus; determine a search range and a search direction based on the location information and predicted pose; perform normalized cross correlation (NCC) matching between pixels of the obtained image based on the determined search range and search direction to identify an edge; and output a location of the edge.

An apparatus for edge detection is provided. The apparatus includes: means for obtaining a depth information and location information for a point detected in an obtained image; means for predicting a pose for the point based on the depth information, location information, and information about movement of a device; means for determining a search range and a search direction based on the location information and predicted pose; means for performing normalized cross correlation (NCC) matching between pixels of the obtained image based on the determined search range and search direction to identify an edge; and means for outputting a location of the edge.

In some aspects, one or more of the apparatuses described herein can include or be part of an extended reality device (e.g., a virtual reality (VR) device, an augmented reality (AR) device, or a mixed reality (MR) device), a mobile device (e.g., a mobile telephone or other mobile device), a wearable device (e.g., a network-connected watch or other wearable device), a personal computer, a laptop computer, a server computer, a television, a video game console, or other device. In some aspects, the one or more apparatuses can include at least one camera for capturing one or more images or video frames. For example, the one or more apparatuses can include a camera (e.g., an RGB camera) or multiple cameras for capturing one or more images and/or one or more videos including video frames. In some aspects, the one or more apparatuses can include a display for displaying one or more images, videos, notifications, or other displayable data. In some aspects, the one or more apparatuses can include at least one transmitter configured to transmit data or information over a transmission medium to at least one device. In some aspects, at least one processor of the one or more apparatuses can include a central processing unit (CPU), a digital signal processor (DSP), a graphics processing unit (GPU), a neural processing unit (NPU), a neural signal process (NSP), or other processing device or component.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and examples, will become more apparent upon referring to the following specification, claims, and accompanying drawings.

BRIEF DESCRIPTION OF THE DRAWINGS

Illustrative examples of the present application are described in detail below with reference to the following figures.

DETAILED DESCRIPTION

Figure 1:
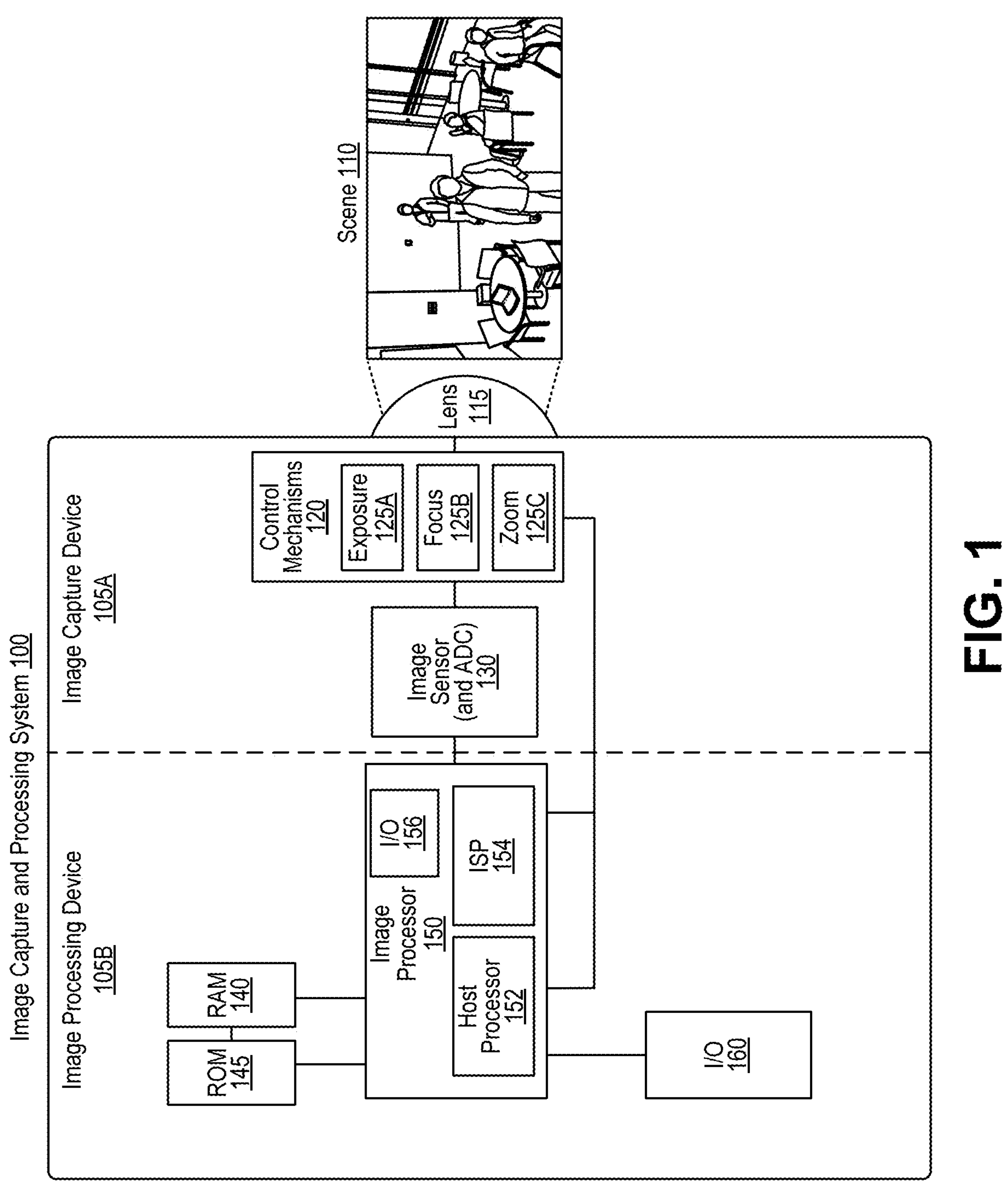
FIG. 1 is a block diagram illustrating an architecture of an image capture and processing system, in accordance with aspects of the present disclosure.

Certain aspects and examples of this disclosure are provided below. Some of these aspects and examples may be applied independently and some of them may be applied in combination as would be apparent to those of skill in the art. In the following description, for the purposes of explanation, specific details are set forth in order to provide a thorough understanding of subject matter of the application. However, it will be apparent that various examples may be practiced without these specific details. The figures and description are not intended to be restrictive.

The ensuing description provides illustrative examples only, and is not intended to limit the scope, applicability, or configuration of the disclosure. Rather, the ensuing description will provide those skilled in the art with an enabling description for implementing the illustrative examples. It should be understood that various changes may be made in the function and arrangement of elements without departing from the spirit and scope of the application as set forth in the appended claims.

A camera (e.g., image capture device) is a device that receives light and captures image frames, such as still images or video frames, using an image sensor. The terms "image," "image frame," and "frame" are used interchangeably herein. Cameras can be configured with a variety of image capture and image processing settings. The different settings result in images with different appearances. Some camera settings are determined and applied before or during capture of one or more image frames, such as ISO, exposure time, aperture size, f/stop, shutter speed, focus, and gain. For example, settings or parameters can be applied to an image sensor for capturing the one or more image frames. Other camera settings can configure post-processing of one or more image frames, such as alterations to contrast, brightness, saturation, sharpness, levels, curves, or colors. For example, settings or parameters can be applied to a processor (e.g., an image signal processor or ISP) for processing the one or more image frames captured by the image sensor.

Degrees of freedom (DoF) refer to the number of basic ways a rigid object can move through three-dimensional (3D) space. In some cases, six different DoF can be tracked. The six degrees of freedom include three translational degrees of freedom corresponding to translational movement along three perpendicular axes. The three axes can be referred to as x, y, and z axes. The six degrees of freedom include three rotational degrees of freedom corresponding to rotational movement around the three axes, which can be referred to as pitch, yaw, and roll.

Extended reality (XR) systems or devices can provide virtual content to a user and/or can combine real-world or physical environments and virtual environments (made up of virtual content) to provide users with XR experiences. The real-world environment can include real-world objects (also referred to as physical objects), such as people, vehicles, buildings, tables, chairs, and/or other real-world or physical objects. XR systems or devices can facilitate interaction with different types of XR environments (e.g., a user can use an XR system or device to interact with an XR environment). XR systems can include virtual reality (VR) systems facilitating interactions with VR environments, augmented reality (AR) systems facilitating interactions with AR environments, mixed reality (MR) systems facilitating interactions with MR environments, and/or other XR systems. Examples of XR systems or devices include head-mounted displays (HMDs), smart glasses, among others. In some cases, an XR system can track parts of the user (e.g., a hand and/or fingertips of a user) to allow the user to interact with items of virtual content.

AR is a technology that provides virtual or computer-generated content (referred to as AR content) over the user's view of a physical, real-world scene or environment. AR content can include virtual content, such as video, images, graphic content, location data (e.g., global positioning system (GPS) data or other location data), sounds, any combination thereof, and/or other augmented content. An AR system or device is designed to enhance (or augment), rather than to replace, a person's current perception of reality. For example, a user can see a real stationary or moving physical object through an AR device display, but the user's visual perception of the physical object may be augmented or enhanced by a virtual image of that object (e.g., a real-world car replaced by a virtual image of a DeLorean), by AR content added to the physical object (e.g., virtual wings added to a live animal), by AR content displayed relative to the physical object (e.g., informational virtual content displayed near a sign on a building, a virtual coffee cup virtually anchored to (e.g., placed on top of) a real-world table in one or more images, etc.), and/or by displaying other types of AR content. Various types of AR systems can be used for gaming, entertainment, and/or other applications.

In some cases, an XR system can include an optical "see-through" or "pass-through" display (e.g., see-through or pass-through AR HMD or AR glasses), allowing the XR system to display XR content (e.g., AR content) directly onto a real-world view without displaying video content. For example, a user may view physical objects through a display (e.g., glasses or lenses), and the AR system can display AR content onto the display to provide the user with an enhanced visual perception of one or more real-world objects. In one example, a display of an optical see-through AR system can include a lens or glass in front of each eye (or a single lens or glass over both eyes). The see-through display can allow the user to see a real-world or physical object directly, and can display (e.g., projected or otherwise displayed) an enhanced image of that object or additional AR content to augment the user's visual perception of the real world.

Visual simultaneous localization and mapping (VSLAM) is a computational geometry technique used in devices with cameras, such as robots, head-mounted displays (HMDs), mobile handsets, and autonomous vehicles. In VSLAM, a device can construct and update a map of an unknown environment based on images captured by the device's camera. The device can keep track of the device's pose within the environment (e.g., location and/or orientation) as the device updates the map. For example, the device can be activated in a particular room of a building and can move throughout the interior of the building, capturing images. The device can map the environment, and keep track of its location in the environment, based on tracking where different objects in the environment appear in different images.

In the context of systems that track movement through an environment, such as XR systems and/or VSLAM systems, degrees of freedom can refer to which of the six degrees of freedom the system is capable of tracking. 3DoF systems generally track the three rotational DoF-pitch, yaw, and roll. A 3DoF headset, for instance, can track the user of the headset turning their head left or right, tilting their head up or down, and/or tilting their head to the left or right. 6DoF systems can track the three translational DoF as well as the three rotational DoF. Thus, a 6DoF headset, for instance, and can track the user moving forward, backward, laterally, and/or vertically in addition to tracking the three rotational DoF.

In some cases, a system which may use visual systems to track movement through an environment, such as SLAM/VSLAM systems, may detect and use features of the environment to help track the movement of the system. In some cases, the features may correspond to corners. In some cases, a corner feature may have two (or more) gradient with different directions, making corner features relatively easier to detect and track. Using corner features for SLAM/VSLAM works well in environments with lots of corners, but issues (e.g., jitter, artifacts, etc.) can arise in environments with few or no visible corners. In some cases, it may be useful to use direct tracking techniques for feature tracking for SLAM/6DoF. In some cases, direct feature tracking may involve feature tracking with high gradient image pixels and direct feature tracking may track corners as well as unidirectional local image gradients, such as edgelets.

Systems and techniques are described for performing normalized cross-correlation (NCC) based edge tracking. In some cases, movement tracking device (e.g., SLAM/VSLAM, XR system, etc.) may obtain an image and detect a point in the image corresponding to an edgelet. Depth information and location information for the point may be obtained, for example, via stereo depth imaging, depth sensors, multiple views of the point, etc. A pose for the point may be predicted based on the depth information, location information, and movement information for the apparatus. In some cases, the movement information may be based on information from an internal measurement unit (IMU) of the device. A search range and search direction may be determined based on the location information and predicted pose for the point. In some cases, the search direction may be an epipolar direction or a projected normal direction. In some examples, the search range may be determined based on an amount of uncertainty for the information from the IMU. In some cases, this uncertainty may increase based on an amount of time between when a previous pose of the device was determined and a current time.

A normalized cross correlation (NCC) match may be performed for pixels of the image using the search range and search direction. For example, a reference patch size may be determined based on the uncertainty in the depth information. The reference patch may be overlayed on the image based on the search range and the search direction and the NCC may be performed for pixels inside the reference patch within the search range and along the search direction. The NCC may determine NCC scores indicating how similar a pixel being searched is to another pixel in the image. A maximum NCC score based on the search range and search direction may be located identifying an edge in the image. A line may be fitted to the edge to verify the edge. In some cases, a direction of the edge may be estimated. A patch from the image may be obtained based on the edge and a line may be fit to the pixel values in the patch. In some cases, random sample consensus (RANSAC) may be performed for the pixel values in the patch to fit the line. This line may be compared to the direction of the edge. If the direction of the edge matches the line (e.g., within a threshold amount), the edge may be verified. The location of the edge may then be outputted.

Various aspects of the application will be described with respect to the figures.

FIG. 1 is a block diagram illustrating an architecture of an image capture and processing system 100. The image capture and processing system 100 includes various components that are used to capture and process images of scenes (e.g., an image of a scene 110). The image capture and processing system 100 can capture standalone images (or photographs) and/or can capture videos that include multiple images (or video frames) in a particular sequence. In some cases, the lens 115 and image sensor 130 can be associated with an optical axis. In one illustrative example, the photosensitive area of the image sensor 130 (e.g., the photodiodes) and the lens 115 can both be centered on the optical axis. A lens 115 of the image capture and processing system 100 faces a scene 110 and receives light from the scene 110. The lens 115 bends incoming light from the scene toward the image sensor 130. The light received by the lens 115 passes through an aperture. In some cases, the aperture (e.g., the aperture size) is controlled by one or more control mechanisms 120 and is received by an image sensor 130. In some cases, the aperture can have a fixed size.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo (or other lens mechanism), thereby adjusting focus. In some cases, additional lenses may be included in the image capture and processing system 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), hybrid autofocus (HAF), or some combination thereof. The focus setting may be determined using the control mechanism 120, the image sensor 130, and/or the image processor 150. The focus setting may be referred to as an image capture setting and/or an image processing setting. In some cases, the lens 115 can be fixed relative to the image sensor and focus control mechanism 125B can be omitted without departing from the scope of the present disclosure.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a duration of time for which the sensor collects light (e.g., exposure time or electronic shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos (or other lens mechanism) to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference of one another) with a negative (e.g., diverging, concave) lens between them. In some cases, the zoom control mechanism 125C moves one or more of the lenses in the afocal zoom system, such as the negative lens and one or both of the positive lenses. In some cases, zoom control mechanism 125C can control the zoom by capturing an image from an image sensor of a plurality of image sensors (e.g., including image sensor 130) with a zoom corresponding to the zoom setting. For example, image processing system 100 can include a wide angle image sensor with a relatively low zoom and a telephoto image sensor with a greater zoom. In some cases, based on the selected zoom setting, the zoom control mechanism 125C can capture images from a corresponding sensor.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different filters. In some cases, different photodiodes can be covered in color filters, and may thus measure light matching the color of the filter covering the photodiode. Various color filter arrays can be used, including a Bayer color filter array, a quad color filter array (also referred to as a quad Bayer color filter array or QCFA), and/or any other color filter array. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter.

Returning to FIG. 1, other types of color filters may use yellow, magenta, and/or cyan (also referred to as "emerald") color filters instead of or in addition to red, blue, and/or green color filters. In some cases, some photodiodes may be configured to measure infrared (IR) light. In some implementations, photodiodes measuring IR light may not be covered by any filter, thus allowing IR photodiodes to measure both visible (e.g., color) and IR light. In some examples, IR photodiodes may be covered by an IR filter, allowing IR light to pass through and blocking light from other parts of the frequency spectrum (e.g., visible light, color). Some image sensors (e.g., image sensor 130) may lack filters (e.g., color, IR, or any other part of the light spectrum) altogether and may instead use different photodiodes throughout the pixel array (in some cases vertically stacked). The different photodiodes throughout the pixel array can have different spectral sensitivity curves, therefore responding to different wavelengths of light. Monochrome image sensors may also lack filters and therefore lack color depth.

In some cases, the image sensor 130 may alternately or additionally include opaque and/or reflective masks that block light from reaching certain photodiodes, or portions of certain photodiodes, at certain times and/or from certain angles. In some cases, opaque and/or reflective masks may be used for phase detection autofocus (PDAF). In some cases, the opaque and/or reflective masks may be used to block portions of the electromagnetic spectrum from reaching the photodiodes of the image sensor (e.g., an IR cut filter, a UV cut filter, a band-pass filter, low-pass filter, high-pass filter, or the like). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

Figure 14:
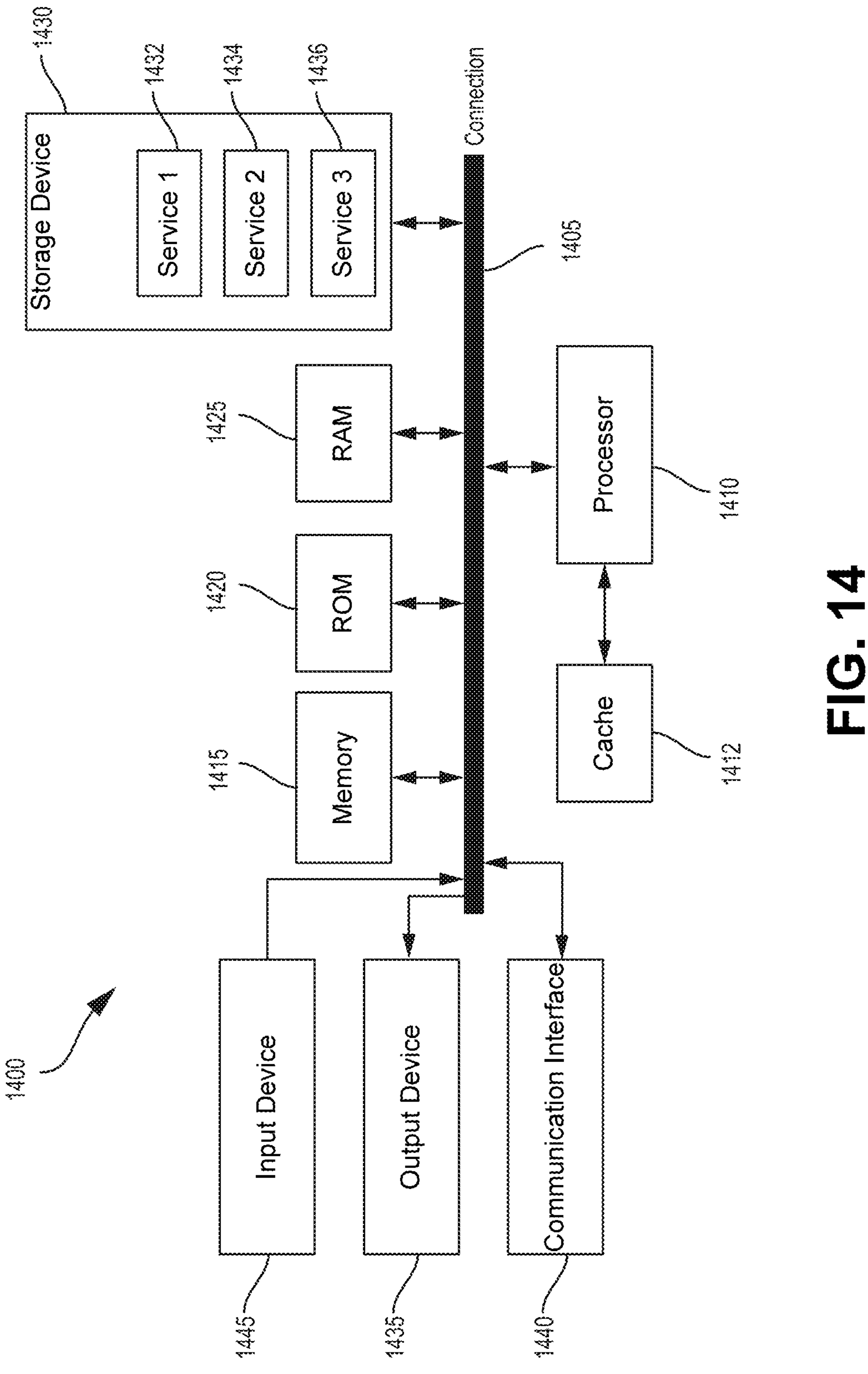
FIG. 14 is a diagram illustrating an example of a system for implementing certain aspects of the present technology.

The image processor 150 may include one or more processors, such as one or more image signal processors (ISPs) (including ISP 154), one or more host processors (including host processor 152), and/or one or more of any other type of processor 1410 of FIG. 14 discussed with respect to the computing system 1400 of FIG. 14. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140/1025, read-only memory (ROM) 145/1020, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices 1035, any other input devices 1045, or some combination thereof. In some cases, a caption may be input into the image processing device 105B through a physical keyboard or keypad of the I/O devices 160, or through a virtual keyboard or keypad of a touchscreen of the I/O devices 160. The I/O devices 160 may include one or more ports, jacks, or other connectors that enable a wired connection between the image capture and processing system 100 and one or more peripheral devices, over which the image capture and processing system 100 may receive data from the one or more peripheral device and/or transmit data to the one or more peripheral devices. The I/O devices 160 may include one or more wireless transceivers that enable a wireless connection between the image capture and processing system 100 and one or more peripheral devices, over which the image capture and processing system 100 may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O devices 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 802.11 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

Figure 2:
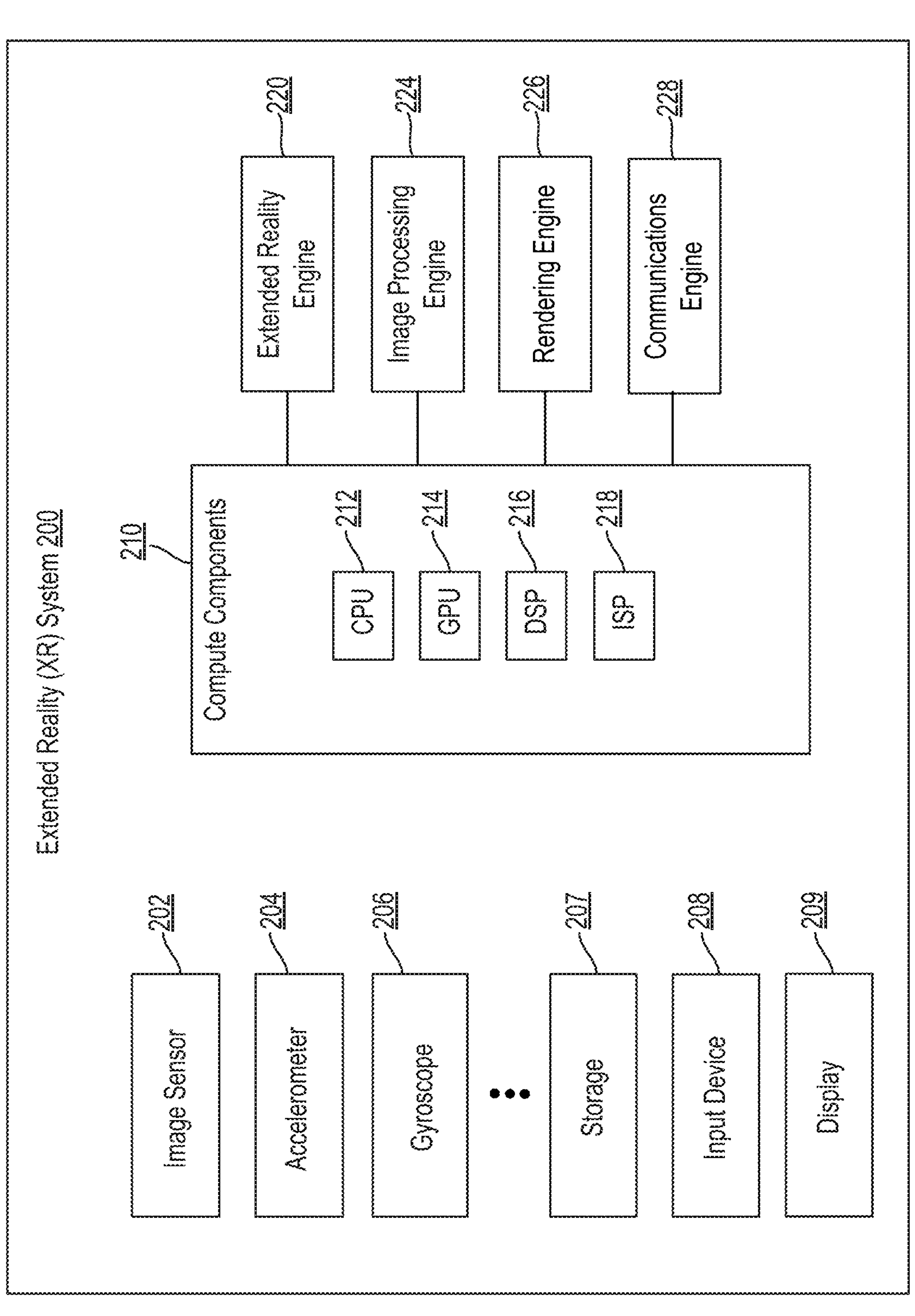
FIG. 2 is a diagram illustrating an architecture of an example extended reality (XR) system, in accordance with some aspects of the disclosure.

In some examples, the extended reality (XR) system 200 of FIG. 2 can include the image capture and processing system 100, the image capture device 105A, the image processing device 105B, or a combination thereof. In some examples, the simultaneous localization and mapping (SLAM) system 300 of FIG. 3 can include the image capture and processing system 100, the image capture device 105A, the image processing device 105B, or a combination thereof.

FIG. 2 is a diagram illustrating an architecture of an example extended reality (XR) system 200, in accordance with some aspects of the disclosure. The XR system 200 can run (or execute) XR applications and implement XR operations. In some examples, the XR system 200 can perform tracking and localization, mapping of an environment in the physical world (e.g., a scene), and/or positioning and rendering of virtual content on a display 209 (e.g., a screen, visible plane/region, and/or other display) as part of an XR experience. For example, the XR system 200 can generate a map (e.g., a three-dimensional (3D) map) of an environment in the physical world, track a pose (e.g., location and position) of the XR system 200 relative to the environment (e.g., relative to the 3D map of the environment), position and/or anchor virtual content in a specific location(s) on the map of the environment, and render the virtual content on the display 209 such that the virtual content appears to be at a location in the environment corresponding to the specific location on the map of the scene where the virtual content is positioned and/or anchored. The display 209 can include a glass, a screen, a lens, a projector, and/or other display mechanism that allows a user to see the real-world environment and also allows XR content to be overlaid, overlapped, blended with, or otherwise displayed thereon.

In this illustrative example, the XR system 200 includes one or more image sensors 202, an accelerometer 204, a gyroscope 206, storage 207, compute components 210, an XR engine 220, an image processing engine 224, a rendering engine 226, and a communications engine 228. It should be noted that the components 202-228 shown in FIG. 2 are non-limiting examples provided for illustrative and explanation purposes, and other examples can include more, fewer, or different components than those shown in FIG. 2. For example, in some cases, the XR system 200 can include one or more other sensors (e.g., one or more inertial measurement units (IMUs), light detection and ranging (LIDAR) sensors, radio detection and ranging (RADAR) sensors, sound detection and ranging (SODAR) sensors, sound navigation and ranging (SONAR) sensors. audio sensors, etc.), one or more display devices, one more other processing engines, one or more other hardware components, and/or one or more other software and/or hardware components that are not shown in FIG. 2. While various components of the XR system 200, such as the image sensor 202, may be referenced in the singular form herein, it should be understood that the XR system 200 may include multiple of any component discussed herein (e.g., multiple image sensors 202).

The XR system 200 includes or is in communication with (wired or wirelessly) an input device 208. The input device 208 can include any suitable input device, such as a touchscreen, a pen or other pointer device, a keyboard, a mouse a button or key, a microphone for receiving voice commands, a gesture input device for receiving gesture commands, a video game controller, a steering wheel, a joystick, a set of buttons, a trackball, a remote control, remote body sensor, handheld controller, any other input device 945 discussed herein, or any combination thereof. In some cases, the image sensor 202 can capture images that can be processed for interpreting gesture commands.

The XR system 200 can also communicate with one or more other electronic devices (wired or wirelessly). For example, communications engine 228 can be configured to manage connections and communicate with one or more electronic devices. In some cases, the communications engine 228 can correspond to the communications interface 940 of FIG. 9.

In some implementations, the one or more image sensors 202, the accelerometer 204, the gyroscope 206, storage 207, compute components 210, XR engine 220, image processing engine 224, and rendering engine 226 can be part of the same computing device. For example, in some cases, the one or more image sensors 202, the accelerometer 204, the gyroscope 206, storage 207, compute components 210, XR engine 220, image processing engine 224, and rendering engine 226 can be integrated into an HMD, extended reality glasses, smartphone, laptop, tablet computer, gaming system, and/or any other computing device. However, in some implementations, the one or more image sensors 202, the accelerometer 204, the gyroscope 206, storage 207, compute components 210, XR engine 220, image processing engine 224, and rendering engine 226 can be part of two or more separate computing devices. For example, in some cases, some of the components 202-226 can be part of, or implemented by, one computing device and the remaining components can be part of, or implemented by, one or more other computing devices.

The storage 207 can be any storage device(s) for storing data. Moreover, the storage 207 can store data from any of the components of the XR system 200. For example, the storage 207 can store data from the image sensor 202 (e.g., image or video data), data from the accelerometer 204 (e.g., measurements), data from the gyroscope 206 (e.g., measurements), data from the compute components 210 (e.g., processing parameters, preferences, virtual content, rendering content, scene maps, tracking and localization data, object detection data, privacy data, XR application data, face recognition data, occlusion data, etc.), data from the XR engine 220, data from the image processing engine 224, and/or data from the rendering engine 226 (e.g., output frames). In some examples, the storage 207 can include a buffer for storing frames for processing by the compute components 210.

The one or more compute components 210 can include a central processing unit (CPU) 212, a graphics processing unit (GPU) 214, a digital signal processor (DSP) 216, an image signal processor (ISP) 218, and/or other processor (e.g., a neural processing unit (NPU) implementing one or more trained neural networks). The compute components 210 can perform various operations such as image enhancement, computer vision, graphics rendering, extended reality operations (e.g., tracking, localization, pose estimation, mapping, content anchoring, content rendering, etc.), image and/or video processing, sensor processing, recognition (e.g., text recognition, facial recognition, object recognition, feature recognition, tracking or pattern recognition, scene recognition, occlusion detection, etc.), trained machine learning operations, filtering, and/or any of the various operations described herein. In some examples, the compute components 210 can implement (e.g., control, operate, etc.) the XR engine 220, the image processing engine 224, and the rendering engine 226. In other examples, the compute components 210 can also implement one or more other processing engines.

The image sensor 202 can include any image and/or video sensors or capturing devices. In some examples, the image sensor 202 can be part of a multiple-camera assembly, such as a dual-camera assembly. The image sensor 202 can capture image and/or video content (e.g., raw image and/or video data), which can then be processed by the compute components 210, the XR engine 220, the image processing engine 224, and/or the rendering engine 226 as described herein. In some examples, the image sensors 202 may include an image capture and processing system 100, an image capture device 105A, an image processing device 105B, or a combination thereof.

In some examples, the image sensor 202 can capture image data and can generate images (also referred to as frames) based on the image data and/or can provide the image data or frames to the XR engine 220, the image processing engine 224, and/or the rendering engine 226 for processing. An image or frame can include a video frame of a video sequence or a still image. An image or frame can include a pixel array representing a scene. For example, an image can be a red-green-blue (RGB) image having red, green, and blue color components per pixel; a luma, chroma-red, chroma-blue (YCbCr) image having a luma component and two chroma (color) components (chroma-red and chroma-blue) per pixel; or any other suitable type of color or monochrome image.

In some cases, the image sensor 202 (and/or other camera of the XR system 200) can be configured to also capture depth information. For example, in some implementations, the image sensor 202 (and/or other camera) can include an RGB-depth (RGB-D) camera. In some cases, the XR system 200 can include one or more depth sensors (not shown) that are separate from the image sensor 202 (and/or other camera) and that can capture depth information. For instance, such a depth sensor can obtain depth information independently from the image sensor 202. In some examples, a depth sensor can be physically installed in the same general location as the image sensor 202, but may operate at a different frequency or frame rate from the image sensor 202. In some examples, a depth sensor can take the form of a light source that can project a structured or textured light pattern, which may include one or more narrow bands of light, onto one or more objects in a scene. Depth information can then be obtained by exploiting geometrical distortions of the projected pattern caused by the surface shape of the object. In one example, depth information may be obtained from stereo sensors such as a combination of an infra-red structured light projector and an infra-red camera registered to a camera (e.g., an RGB camera).

The XR system 200 can also include other sensors in its one or more sensors. The one or more sensors can include one or more accelerometers (e.g., accelerometer 204), one or more gyroscopes (e.g., gyroscope 206), and/or other sensors. The one or more sensors can provide velocity, orientation, and/or other position-related information to the compute components 210. For example, the accelerometer 204 can detect acceleration by the XR system 200 and can generate acceleration measurements based on the detected acceleration. In some cases, the accelerometer 204 can provide one or more translational vectors (e.g., up/down, left/right, forward/back) that can be used for determining a position or pose of the XR system 200. The gyroscope 206 can detect and measure the orientation and angular velocity of the XR system 200. For example, the gyroscope 206 can be used to measure the pitch, roll, and yaw of the XR system 200. In some cases, the gyroscope 206 can provide one or more rotational vectors (e.g., pitch, yaw, roll). In some examples, the image sensor 202 and/or the XR engine 220 can use measurements obtained by the accelerometer 204 (e.g., one or more translational vectors) and/or the gyroscope 206 (e.g., one or more rotational vectors) to calculate the pose of the XR system 200. As previously noted, in other examples, the XR system 200 can also include other sensors, such as an inertial measurement unit (IMU), a magnetometer, a gaze and/or eye tracking sensor, a machine vision sensor, a smart scene sensor, a speech recognition sensor, an impact sensor, a shock sensor, a position sensor, a tilt sensor, etc.

As noted above, in some cases, the one or more sensors can include at least one IMU. An IMU is an electronic device that measures the specific force, angular rate, and/or the orientation of the XR system 200, using a combination of one or more accelerometers, one or more gyroscopes, and/or one or more magnetometers. In some examples, the one or more sensors can output measured information associated with the capture of an image captured by the image sensor 202 (and/or other camera of the XR system 200) and/or depth information obtained using one or more depth sensors of the XR system 200.

The output of one or more sensors (e.g., the accelerometer 204, the gyroscope 206, one or more IMUs, and/or other sensors) can be used by the XR engine 220 to determine a pose of the XR system 200 (also referred to as the head pose) and/or the pose of the image sensor 202 (or other camera of the XR system 200). In some cases, the pose of the XR system 200 and the pose of the image sensor 202 (or other camera) can be the same. The pose of image sensor 202 refers to the position and orientation of the image sensor 202 relative to a frame of reference (e.g., with respect to the scene 110). In some implementations, the camera pose can be determined for 6-Degrees Of Freedom (6DoF), which refers to three translational components (e.g., which can be given by X (horizontal), Y (vertical), and Z (depth) coordinates relative to a frame of reference, such as the image plane) and three angular components (e.g. roll, pitch, and yaw relative to the same frame of reference). In some implementations, the camera pose can be determined for 3-Degrees Of Freedom (3DoF), which refers to the three angular components (e.g. roll, pitch, and yaw).

In some cases, a device tracker (not shown) can use the measurements from the one or more sensors and image data from the image sensor 202 to track a pose (e.g., a 6DoF pose) of the XR system 200. For example, the device tracker can fuse visual data (e.g., using a visual tracking solution) from the image data with inertial data from the measurements to determine a position and motion of the XR system 200 relative to the physical world (e.g., the scene) and a map of the physical world. As described below, in some examples, when tracking the pose of the XR system 200, the device tracker can generate a three-dimensional (3D) map of the scene (e.g., the real world) and/or generate updates for a 3D map of the scene. The 3D map updates can include, for example and without limitation, new or updated features and/or feature or landmark points associated with the scene and/or the 3D map of the scene, localization updates identifying or updating a position of the XR system 200 within the scene and the 3D map of the scene, etc. The 3D map can provide a digital representation of a scene in the real/physical world. In some examples, the 3D map can anchor location-based objects and/or content to real-world coordinates and/or objects. The XR system 200 can use a mapped scene (e.g., a scene in the physical world represented by, and/or associated with, a 3D map) to merge the physical and virtual worlds and/or merge virtual content or objects with the physical environment.

In some aspects, the pose of image sensor 202 and/or the XR system 200 as a whole can be determined and/or tracked by the compute components 210 using a visual tracking solution based on images captured by the image sensor 202 (and/or other camera of the XR system 200). For instance, in some examples, the compute components 210 can perform tracking using computer vision-based tracking, model-based tracking, and/or simultaneous localization and mapping (SLAM) techniques. For instance, the compute components 210 can perform SLAM or can be in communication (wired or wireless) with a SLAM system (not shown), such as the SLAM system 300 of FIG. 3. SLAM refers to a class of techniques where a map of an environment (e.g., a map of an environment being modeled by XR system 200) is created while simultaneously tracking the pose of a camera (e.g., image sensor 202) and/or the XR system 200 relative to that map. The map can be referred to as a SLAM map, and can be three-dimensional (3D). The SLAM techniques can be performed using color or grayscale image data captured by the image sensor 202 (and/or other camera of the XR system 200), and can be used to generate estimates of 6DoF pose measurements of the image sensor 202 and/or the XR system 200. Such a SLAM technique configured to perform 6DoF tracking can be referred to as 6DoF SLAM. In some cases, the output of the one or more sensors (e.g., the accelerometer 204, the gyroscope 206, one or more IMUs, and/or other sensors) can be used to estimate, correct, and/or otherwise adjust the estimated pose.

In some cases, the 6DoF SLAM (e.g., 6DoF tracking) can associate features observed from certain input images from the image sensor 202 (and/or other camera) to the SLAM map. For example, 6DoF SLAM can use feature point associations from an input image to determine the pose (position and orientation) of the image sensor 202 and/or XR system 200 for the input image. 6DoF mapping can also be performed to update the SLAM map. In some cases, the SLAM map maintained using the 6DoF SLAM can contain 3D feature points triangulated from two or more images. For example, key frames can be selected from input images or a video stream to represent an observed scene. For every key frame, a respective 6DoF camera pose associated with the image can be determined. The pose of the image sensor 202 and/or the XR system 200 can be determined by projecting features from the 3D SLAM map into an image or video frame and updating the camera pose from verified 2D-3D correspondences.

In one illustrative example, the compute components 210 can extract feature points from certain input images (e.g., every input image, a subset of the input images, etc.) or from each key frame. A feature point (also referred to as a registration point) as used herein is a distinctive or identifiable part of an image, such as a part of a hand, an edge of a table, among others. Features extracted from a captured image can represent distinct feature points along three-dimensional space (e.g., coordinates on X, Y, and Z-axes), and every feature point can have an associated feature location. The feature points in key frames either match (are the same or correspond to) or fail to match the feature points of previously-captured input images or key frames. Feature detection can be used to detect the feature points. Feature detection can include an image processing operation used to examine one or more pixels of an image to determine whether a feature exists at a particular pixel. Feature detection can be used to process an entire captured image or certain portions of an image. For each image or key frame, once features have been detected, a local image patch around the feature can be extracted. Features may be extracted using any suitable technique, such as Scale Invariant Feature Transform (SIFT) (which localizes features and generates their descriptions), Learned Invariant Feature Transform (LIFT), Speed Up Robust Features (SURF), Gradient Location-Orientation histogram (GLOH), Oriented Fast and Rotated Brief (ORB), Binary Robust Invariant Scalable Keypoints (BRISK), Fast Retina Keypoint (FREAK), KAZE, Accelerated KAZE (AKAZE), Normalized Cross Correlation (NCC), descriptor matching, another suitable technique, or any combination thereof.

As one illustrative example, the compute components 210 can extract feature points corresponding to a mobile device, or the like. In some cases, feature points corresponding to the mobile device can be tracked to determine a pose of the mobile device. As described in more detail below, the pose of the mobile device can be used to determine a location for projection of AR media content that can enhance media content displayed on a display of the mobile device.

In some cases, the XR system 200 can also track the hand and/or fingers of the user to allow the user to interact with and/or control virtual content in a virtual environment. For example, the XR system 200 can track a pose and/or movement of the hand and/or fingertips of the user to identify or translate user interactions with the virtual environment. The user interactions can include, for example and without limitation, moving an item of virtual content, resizing the item of virtual content, selecting an input interface element in a virtual user interface (e.g., a virtual representation of a mobile phone, a virtual keyboard, and/or other virtual interface), providing an input through a virtual user interface, etc.

Figure 3:
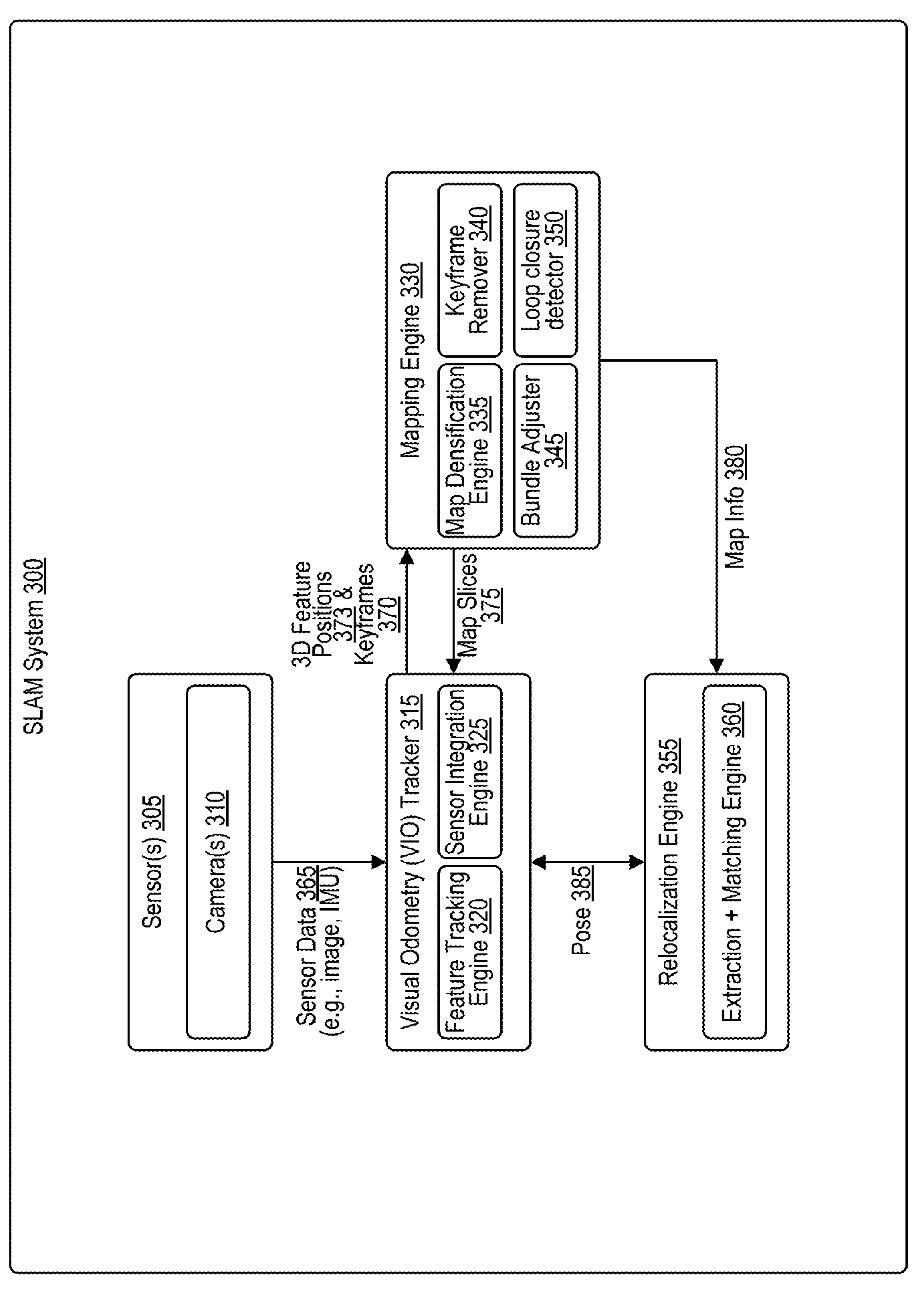
FIG. 3 is a block diagram illustrating an architecture of a simultaneous localization and mapping (SLAM) system, in accordance with aspects of the present disclosure.

FIG. 3 is a block diagram illustrating an architecture of a simultaneous localization and mapping (SLAM) system 300. In some examples, the SLAM system 300 can be, or can include, an extended reality (XR) system, such as the XR system 200 of FIG. 2. In some examples, the SLAM system 300 can be a wireless communication device, a mobile device or handset (e.g., a mobile telephone or so-called "smart phone" or other mobile device), a wearable device, a personal computer, a laptop computer, a server computer, a portable video game console, a portable media player, a camera device, a manned or unmanned ground vehicle, a manned or unmanned aerial vehicle, a manned or unmanned aquatic vehicle, a manned or unmanned underwater vehicle, a manned or unmanned vehicle, an autonomous vehicle, a vehicle, a computing system of a vehicle, a robot, another device, or any combination thereof.

The SLAM system 300 of FIG. 3 includes, or is coupled to, each of one or more sensors 305. The one or more sensors

305 can include one or more cameras 310. Each of the one or more cameras 310 may include an image capture device 105A, an image processing device 105B, an image capture and processing system 100, another type of camera, or a combination thereof. Each of the one or more cameras 310 may be responsive to light from a particular spectrum of light. The spectrum of light may be a subset of the electromagnetic (EM) spectrum. For example, each of the one or more cameras 310 may be a visible light (VL) camera responsive to a VL spectrum, an infrared (IR) camera responsive to an IR spectrum, an ultraviolet (UV) camera responsive to a UV spectrum, a camera responsive to light from another spectrum of light from another portion of the electromagnetic spectrum, or a some combination thereof.

The one or more sensors 305 can include one or more other types of sensors other than cameras 310, such as one or more of each of: accelerometers, gyroscopes, magnetometers, inertial measurement units (IMUs), altimeters, barometers, thermometers, RADAR sensors, LIDAR sensors, SONAR sensors, SODAR sensors, global navigation satellite system (GNSS) receivers, global positioning system (GPS) receivers, BeiDou navigation satellite system (BDS) receivers, Galileo receivers, Globalnaya Navigazionnaya Sputnikovaya Sistema (GLONASS) receivers, Navigation Indian Constellation (NavIC) receivers, Quasi-Zenith Satellite System (QZSS) receivers, Wi-Fi positioning system (WPS) receivers, cellular network positioning system receivers, Bluetooth® beacon positioning receivers, short-range wireless beacon positioning receivers, personal area network (PAN) positioning receivers, wide area network (WAN) positioning receivers, wireless local area network (WLAN) positioning receivers, other types of positioning receivers, other types of sensors discussed herein, or combinations thereof. In some examples, the one or more sensors 305 can include any combination of sensors of the XR system 200 of FIG. 2.

The SLAM system 300 of FIG. 3 includes a visual-inertial odometry (VIO) tracker 315. The term visual-inertial odometry may also be referred to herein as visual odometry. The VIO tracker 315 receives sensor data 365 from the one or more sensors 305. For instance, the sensor data 365 can include one or more images captured by the one or more cameras 310. The sensor data 365 can include other types of sensor data from the one or more sensors 305, such as data from any of the types of sensors 305 listed herein. For instance, the sensor data 365 can include inertial measurement unit (IMU) data from one or more IMUs of the one or more sensors 305.

Upon receipt of the sensor data 365 from the one or more sensors 305, the VIO tracker 315 performs feature detection, extraction, and/or tracking using a feature tracking engine 320 of the VIO tracker 315. For instance, where the sensor data 365 includes one or more images captured by the one or more cameras 310 of the SLAM system 300, the VIO tracker 315 can identify, detect, and/or extract features in each image. Features may include visually distinctive points in an image, such as portions of the image depicting edges and/or corners. The VIO tracker 315 can receive sensor data 365 periodically and/or continually from the one or more sensors 305, for instance by continuing to receive more images from the one or more cameras 310 as the one or more cameras 310 capture a video, where the images are video frames of the video. The VIO tracker 315 can generate descriptors for the features. Feature descriptors can be generated at least in part by generating a description of the feature as depicted in a local image patch extracted around the feature. In some examples, a feature descriptor can describe a feature as a collection of one or more feature vectors. The VIO tracker 315, in some cases with the mapping engine 330 and/or the relocalization engine 355, can associate the plurality of features with a map of the environment based on such feature descriptors. The feature tracking engine 320 of the VIO tracker 315 can perform feature tracking by recognizing features in each image that the VIO tracker 315 already previously recognized in one or more previous images, in some cases based on identifying features with matching feature descriptors in different images. The feature tracking engine 320 can track changes in one or more positions at which the feature is depicted in each of the different images. For example, the feature extraction engine can detect a particular corner of a room depicted in a left side of a first image captured by a first camera of the cameras 310. The feature extraction engine can detect the same feature (e.g., the same particular corner of the same room) depicted in a right side of a second image captured by the first camera. The feature tracking engine 320 can recognize that the features detected in the first image and the second image are two depictions of the same feature (e.g., the same particular corner of the same room), and that the feature appears in two different positions in the two images. The VIO tracker 315 can determine, based on the same feature appearing on the left side of the first image and on the right side of the second image that the first camera has moved, for example if the feature (e.g., the particular corner of the room) depicts a static portion of the environment.

The VIO tracker 315 can include a sensor integration engine 325. The sensor integration engine 325 can use sensor data from other types of sensors 305 (other than the cameras 310) to determine information that can be used by the feature tracking engine 320 when performing the feature tracking. For example, the sensor integration engine 325 can receive IMU data (e.g., which can be included as part of the sensor data 365) from an IMU of the one or more sensors 305. The sensor integration engine 325 can determine, based on the IMU data in the sensor data 365, that the SLAM system 300 has rotated 15 degrees in a clockwise direction from acquisition or capture of a first image and capture to acquisition or capture of the second image by a first camera of the cameras 310. Based on this determination, the sensor integration engine 325 can identify that a feature depicted at a first position in the first image is expected to appear at a second position in the second image, and that the second position is expected to be located to the left of the first position by a predetermined distance (e.g., a predetermined number of pixels, inches, centimeters, millimeters, or another distance metric). The feature tracking engine 320 can take this expectation into consideration in tracking features between the first image and the second image.

Based on the feature tracking by the feature tracking engine 320 and/or the sensor integration by the sensor integration engine 325, the VIO tracker 315 can determine a 3D feature positions 373 of a particular feature. The 3D feature positions 373 can include one or more 3D feature positions and can also be referred to as 3D feature points. The 3D feature positions 373 can be a set of coordinates along three different axes that are perpendicular to one another, such as an X coordinate along an X axis (e.g., in a horizontal direction), a Y coordinate along a Y axis (e.g., in a vertical direction) that is perpendicular to the X axis, and a Z coordinate along a Z axis (e.g., in a depth direction) that is perpendicular to both the X axis and the Y axis. The VIO tracker 315 can also determine one or more keyframes 370 (referred to hereinafter as keyframes 370) corresponding to the particular feature. A keyframe (from one or more keyframes 370) corresponding to a particular feature may be an image in which the particular feature is clearly depicted. In some examples, a keyframe (from the one or more keyframes 370) corresponding to a particular feature may be an image in which the particular feature is clearly depicted. In some examples, a keyframe corresponding to a particular feature may be an image that reduces uncertainty in the 3D feature positions 373 of the particular feature when considered by the feature tracking engine 320 and/or the sensor integration engine 325 for determination of the 3D feature positions 373. In some examples, a keyframe corresponding to a particular feature also includes data associated with the pose 385 of the SLAM system 300 and/or the camera(s) 310 during capture of the keyframe. In some examples, the VIO tracker 315 can send 3D feature positions 373 and/or keyframes 370 corresponding to one or more features to the mapping engine 330. In some examples, the VIO tracker 315 can receive map slices 375 from the mapping engine 330. The VIO tracker 315 can feature information within the map slices 375 for feature tracking using the feature tracking engine 320.

Based on the feature tracking by the feature tracking engine 320 and/or the sensor integration by the sensor integration engine 325, the VIO tracker 315 can determine a pose 385 of the SLAM system 300 and/or of the cameras 310 during capture of each of the images in the sensor data 365. The pose 385 can include a location of the SLAM system 300 and/or of the cameras 310 in 3D space, such as a set of coordinates along three different axes that are perpendicular to one another (e.g., an X coordinate, a Y coordinate, and a Z coordinate). The pose 385 can include an orientation of the SLAM system 300 and/or of the cameras 310 in 3D space, such as pitch, roll, yaw, or some combination thereof. In some examples, the VIO tracker 315 can send the pose 385 to the relocalization engine 355. In some examples, the VIO tracker 315 can receive the pose 385 from the relocalization engine 355.

The SLAM system 300 also includes a mapping engine 330. The mapping engine 330 generates a 3D map of the environment based on the 3D feature positions 373 and/or the keyframes 370 received from the VIO tracker 315. The mapping engine 330 can include a map densification engine 335, a keyframe remover 340, a bundle adjuster 345, and/or a loop closure detector 350. The map densification engine 335 can perform map densification, in some examples, increase the quantity and/or density of 3D coordinates describing the map geometry. The keyframe remover 340 can remove keyframes, and/or in some cases add keyframes. In some examples, the keyframe remover 340 can remove keyframes 370 corresponding to a region of the map that is to be updated and/or whose corresponding confidence values are low. The bundle adjuster 345 can, in some examples, refine the 3D coordinates describing the scene geometry, parameters of relative motion, and/or optical characteristics of the image sensor used to generate the frames, according to an optimality criterion involving the corresponding image projections of all points. The loop closure detector 350 can recognize when the SLAM system 300 has returned to a previously mapped region, and can use such information to update a map slice and/or reduce the uncertainty in certain 3D feature points or other points in the map geometry. The mapping engine 330 can output map slices 375 to the VIO tracker 315. The map slices 375 can represent 3D portions or subsets of the map. The map slices 375 can include map slices 375 that represent new, previously-unmapped areas of the map. The map slices 375 can include map slices 375 that represent updates (or modifications or revisions) to previously-mapped areas of the map. The mapping engine 330 can output map information 380 to the relocalization engine 355. The map information 380 can include at least a portion of the map generated by the mapping engine 330. The map information 380 can include one or more 3D points making up the geometry of the map, such as one or more 3D feature positions 373. The map information 380 can include one or more keyframes 370 corresponding to certain features and certain 3D feature positions 373.

The SLAM system 300 also includes a relocalization engine 355. The relocalization engine 355 can perform relocalization, for instance when the VIO tracker 315 fail to recognize more than a threshold number of features in an image, and/or the VIO tracker 315 loses track of the pose 385 of the SLAM system 300 within the map generated by the mapping engine 330. The relocalization engine 355 can perform relocalization by performing extraction and matching using an extraction and matching engine 360. For instance, the extraction and matching engine 360 can by extract features from an image captured by the cameras 310 of the SLAM system 300 while the SLAM system 300 is at a current pose 385, and can match the extracted features to features depicted in different keyframes 370, identified by 3D feature positions 373, and/or identified in the map information 380. By matching these extracted features to the previously-identified features, the relocalization engine 355 can identify that the pose 385 of the SLAM system 300 is a pose 385 at which the previously-identified features are visible to the cameras 310 of the SLAM system 300, and is therefore similar to one or more previous poses 385 at which the previously-identified features were visible to the cameras 310. In some cases, the relocalization engine 355 can perform relocalization based on wide baseline mapping, or a distance between a current camera position and camera position at which feature was originally captured. The relocalization engine 355 can receive information for the pose 385 from the VIO tracker 315, for instance regarding one or more recent poses of the SLAM system 300 and/or cameras 310, which the relocalization engine 355 can base its relocalization determination on. Once the relocalization engine 355 relocates the SLAM system 300 and/or cameras 310 and thus determines the pose 385, the relocalization engine 355 can output the pose 385 to the VIO tracker 315.

In some examples, the VIO tracker 315 can modify the image in the sensor data 365 before performing feature detection, extraction, and/or tracking on the modified image. For example, the VIO tracker 315 can rescale and/or resample the image. In some examples, rescaling and/or resampling the image can include downscaling, downsampling, subscaling, and/or subsampling the image one or more times. In some examples, the VIO tracker 315 modifying the image can include converting the image from color to greyscale, or from color to black and white, for instance by desaturating color in the image, stripping out certain color channel(s), decreasing color depth in the image, replacing colors in the image, or a combination thereof. In some examples, the VIO tracker 315 modifying the image can include the VIO tracker 315 masking certain regions of the image. Dynamic objects can include objects that can have a changed appearance between one image and another. For example, dynamic objects can be objects that move within the environment, such as people, vehicles, or animals. A dynamic objects can be an object that have a changing appearance at different times, such as a display screen that may display different things at different times. A dynamic object can be an object that has a changing appearance based on the pose of the camera(s) 310, such as a reflective surface, a prism, or a specular surface that reflects, refracts, and/or scatters light in different ways depending on the position of the camera(s) 310 relative to the dynamic object. The VIO tracker 315 can detect the dynamic objects using facial detection, facial recognition, facial tracking, object detection, object recognition, object tracking, or a combination thereof. The VIO tracker 315 can detect the dynamic objects using one or more artificial intelligence algorithms, one or more trained machine learning models, one or more trained neural networks, or a combination thereof. The VIO tracker 315 can mask one or more dynamic objects in the image by overlaying a mask over an area of the image (e.g., placing the mask as if covering a portion of the image) that includes depiction(s) of the one or more dynamic objects. The mask can be an opaque color, such as black. The area can be a bounding box having a rectangular or other polygonal shape. The area can be determined on a pixel-by-pixel basis.

In some cases, feature detectors, such as those of the VIO tracker 315 may detect features based primarily on visually distinctive points in the image corresponding to corners. Using corner features for SLAM works well in environments with lots of corners, but issues (e.g., jitter, artifacts, etc.) can arise in environments with few or no visible corners. In some cases, it may be useful to use direct tracking techniques for feature tracking for SLAM/6DoF. In some cases, direct feature tracking may involve feature tracking with high gradient image pixels and direct feature tracking may track corners as well as unidirectional local image gradients, such as edgelets.

Figure 4:
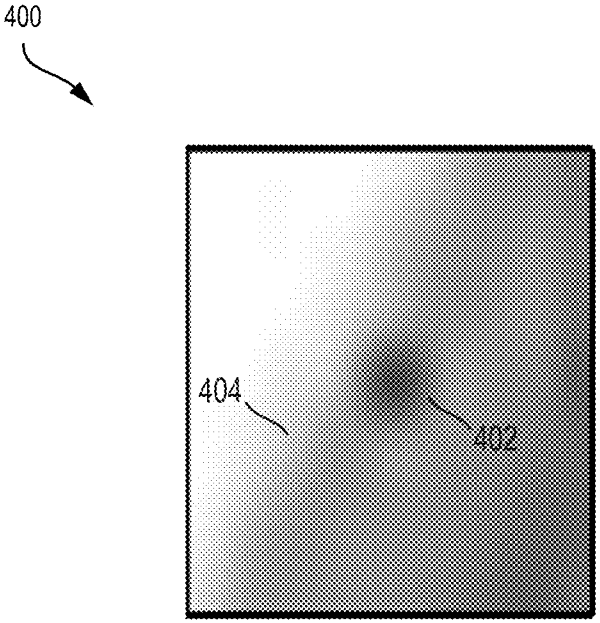
FIG. 4 illustrates an edgelet, in accordance with aspects of the present disclosure.

FIG. 4 illustrates an edgelet 400. Edgelets may be a point 402 in an image (e.g., pixel) along an edge of a gradient 404 that runs in a single direction. For example, a corner feature may have two (or more) gradient with different directions, while an edgelet 400 may have a single gradient 404 that runs in a single direction. Edgelets may be difficult to track as there may be ambiguity along the edge direction (e.g., the edge of the gradient 404). In some cases, a normalized cross correlation (NCC) based technique using a geometric cost function may be used to match and track edgelets. The geometric cost function may consider a residual in a direction perpendicular to a direction of the edge to detect an edgelet 400 and a set of checks may be used to evaluate detected edgelets for reliability.

Figure 5:
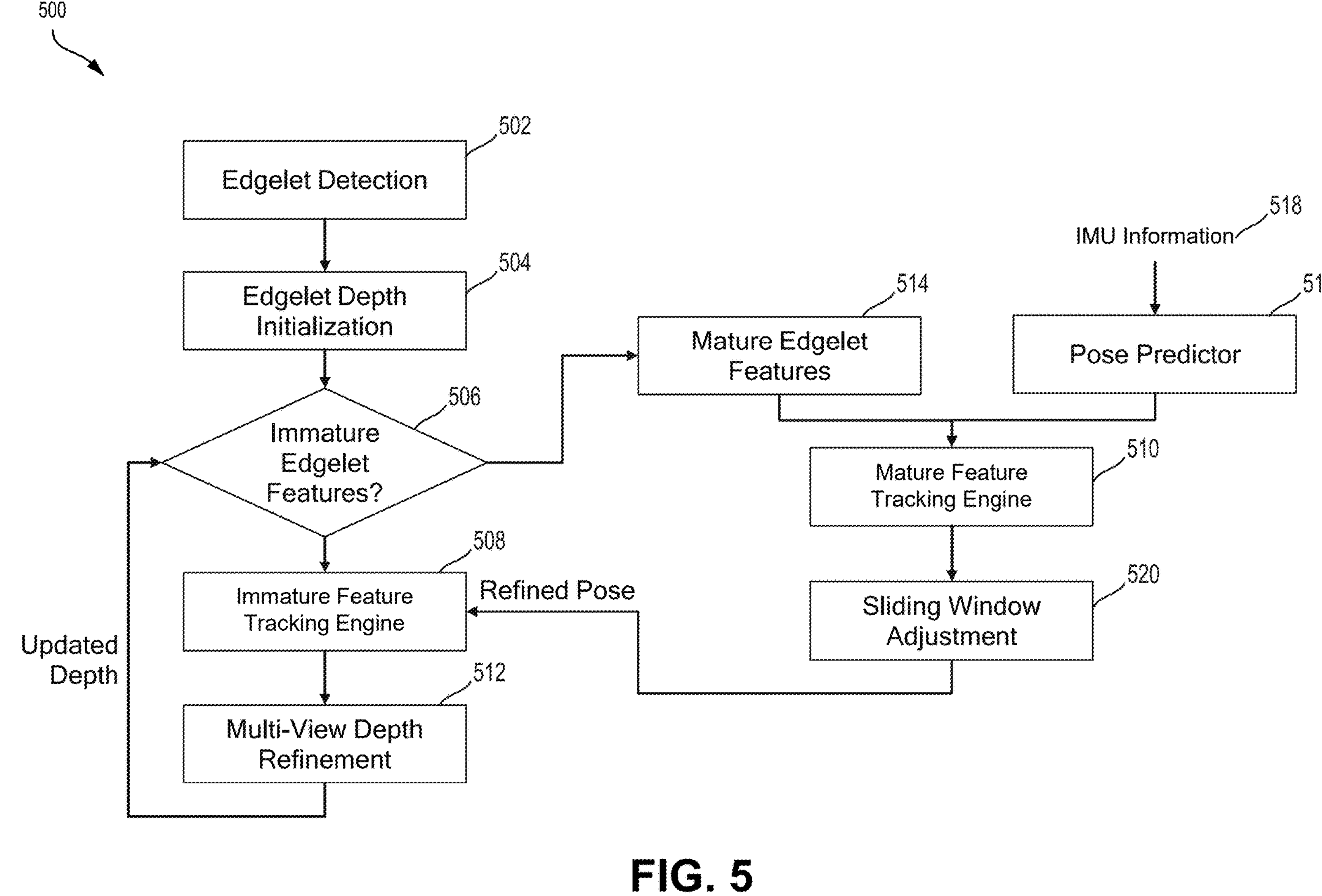
FIG. 5 is a block diagram illustrating a technique for detecting and tracking edgelets 500, in accordance with aspects of the present disclosure.

FIG. 5 is a block diagram illustrating a technique for detecting and tracking edgelets 500, in accordance with aspects of the present disclosure. In FIG. 5, initially, an edgelet may be detected 502. In some cases, one or more images may be received and processed to extract features (e.g., detect) corresponding to an edgelet in one or more images. For example, features may be extracted using any suitable technique, such as Scale Invariant Feature Transform (SIFT) (which localizes features and generates their descriptions), Learned Invariant Feature Transform (LIFT), Speed Up Robust Features (SURF), Gradient Location-Orientation histogram (GLOH), Oriented Fast and Rotated Brief (ORB), Binary Robust Invariant Scalable Keypoints (BRISK), Fast Retina Keypoint (FREAK), KAZE, Accelerated KAZE (AKAZE), Normalized Cross Correlation (NCC), descriptor matching, another suitable technique, or any combination thereof.

In some cases, when an edgelet is first detected, the edgelet may be initialized 504 with a placeholder depth (e.g., depth=0, random depth value, etc.) and the edgelet may be marked as an immature edgelet. In some cases, an immature edgelet may be an edgelet where there is no depth information, or there is insufficient confidence in the depth information associated with the edgelet. A location of the edgelet may be estimated using the depth, if available, or with the placeholder depth, if the depth information is not available. If an edgelet is immature 506, the immature edgelet may be passed into an immature feature matching engine 508. In some cases, the immature feature matching engine 508 may track the immature feature in a manner similar to a mature feature matching engine 510. In some cases, the immature feature matching engine 508 may be the same as the mature feature matching engine 510 and parameters may be used to indicate whether to process an edgelet as an immature edgelet or mature edgelet. For an immature edgelet, a multi-view depth refinement 512 based on, for example, a next image taken at a later time and including the edgelet, may be used to determine depth information for the edgelet and to change the immature edgelet to a mature edgelet.

In cases where depth information is available (e.g., via a depth sensor, stereo depth sensing using multiple cameras, structured or textured light patterns, using monocular sensing techniques, etc.), the edgelet may be initialized 504 using the depth information and the edgelet may be marked as a mature edgelet. If an edgelet is not immature 506 (e.g., is mature), features of the mature edgelet 514 may be passed to the mature feature matching engine 510 along with an estimated location of the mature edgelet 514. In some cases. The mature feature matching engine 510 may also receive a predicted pose for the mature edgelet 514 from a pose predictor 516.

In some cases, the pose predictor 516 may receive IMU information 518 indicating, for example, a predicted current pose of a device based on movement from a previous pose of the device. In some cases, the pose predictor make take a previous frame's estimated pose and IMU information 518 since the previous frame and perform an IMU integration to determine a predicted pose of current frame. The predicted pose and current edgelet location estimate may be used to obtain a predicted location of the edgelet in current frame. The search direction and search range may be used to perform 1D NCC matching to obtain tracked location of the edgelet. Based on the predicted current pose of the device and distance information from the mature edgelet, the pose predictor 516 may predict a pose of the mature edgelet and pass the predicted pose of the mature edgelet to the mature feature matching engine 510. The feature tracking engine 510 may determine a location of the tracked edgelet and output the location to a pose estimation framework, such as a sliding window adjustment 520, to determine a pose of the device based on the location of the edgelet in the environment. While a sliding window adjustment 520 is shown in FIG. 5, it should be understood that the sliding window adjustment 520 is an example and any pose estimation framework may be used. In some cases, the pose of the device may be input to the immature feature matching engine 508 for estimating a pose of immature edgelets.

Figure 6:
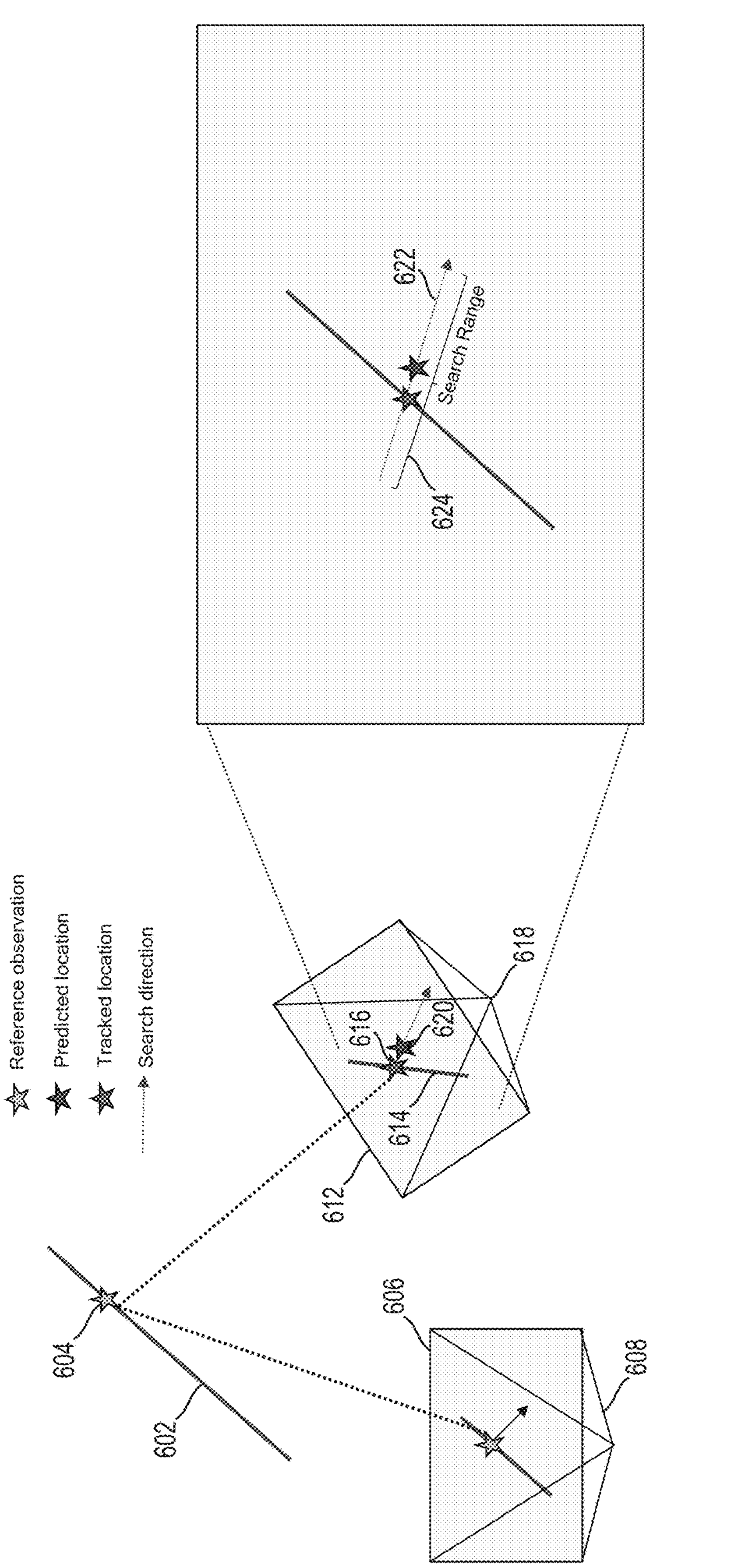
FIG. 6 is a conceptual diagram illustrating a technique for detecting and tracking edgelets, in accordance with aspects of the present disclosure.

FIG. 6 is a conceptual diagram illustrating a technique for detecting and tracking edgelets 600, in accordance with aspects of the present disclosure. In FIG. 6, an environment may include an edge 602 with a detectable edgelet 604. The edge 602 and detectable edgelet 604 may be visible in a first image 606 captured by a device. The first image 606 may be associated with a certain projection 608 used to capture the first image 606. A second image 610 may including the edge 602 and detectable edgelet 604 may be captured. Determining where the edge 614 and a current location estimate for a tracked edgelet 616 in the second image 610 allows the pose of the edgelet 616 to be determined based on the projection 618 of the second image 610. In some cases, a predicted location 620 of the edgelet may be generated, for example, based on depth information for the edgelet visible in the first image 606, the projection 608 information for the first image 606, and IMU information indicating how a device has moved through the environment.

In some cases, the predicted location 620 may not match an actual location of the edgelet 616 as there may be some amount of error in the prediction. In some cases, search information, such as a search direction 622 and search range 624 may be determined based on the predicted location 620, IMU information, and/or a predicted pose of the device. The search direction 622 may be bi-directional and may indicate along a one-dimensional line where a search for the edge 614 and/or tracked edgelet 616 may be performed. The search range 624 may indicate how far the search may be performed. In some cases, the search may be performed in the search direction 622 in a positive and negative direction based on the predicated location 620. In some cases, the predicted location 620 and search information may input to a matching engine to match the predicted location 620 with the tracked edgelet 616.

Figure 7:
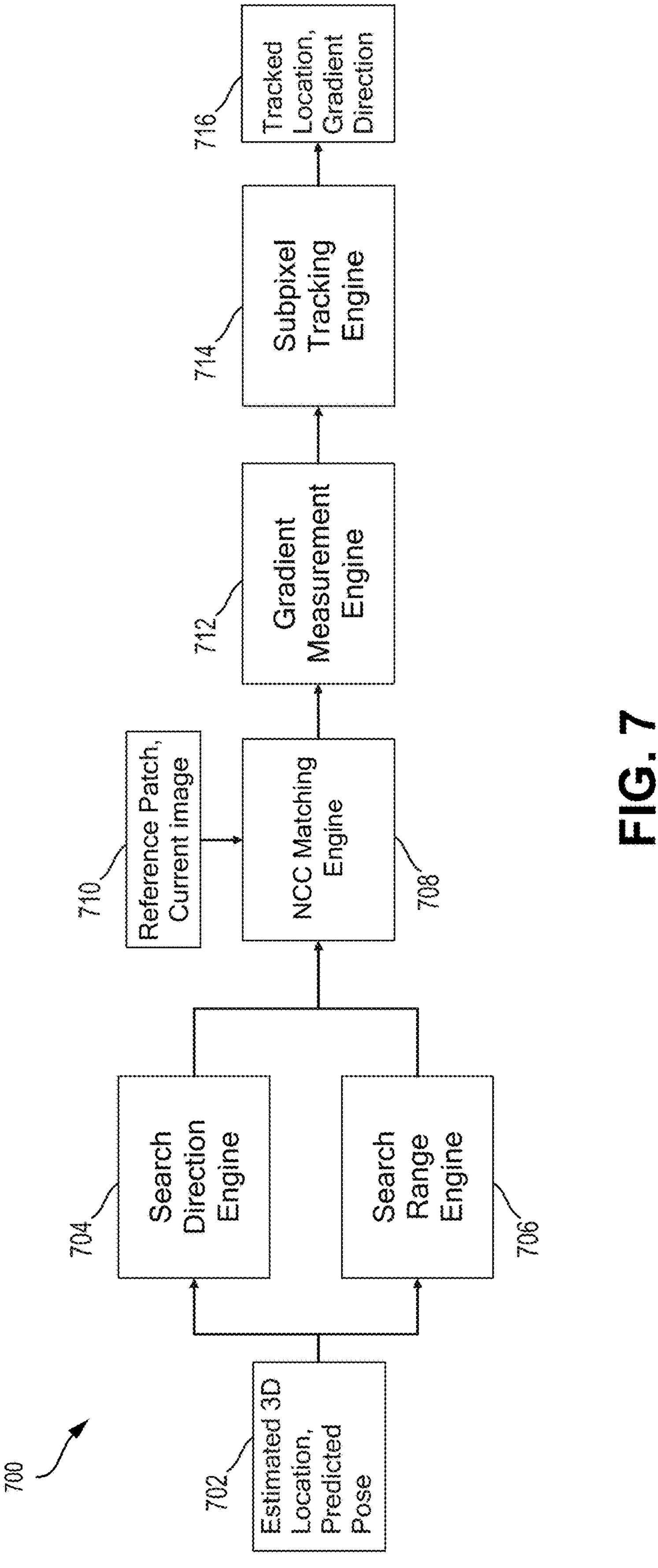
FIG. 7 is a block diagram illustrating a tracking engine, in accordance with aspects of the present disclosure.

FIG. 7 is a block diagram illustrating a tracking engine 700, in accordance with aspects of the present disclosure. The tracking engine 700 may correspond to the immature feature tracking engine 508 of FIG. 5 and/or mature feature tracking engine 510 of FIG. 5. The tracking engine 700 may receive 702 an estimated 3D location for an edgelet (e.g., from the mature edgelet 514 of FIG. 5) and a predicted pose (e.g., from the pose predictor 516 of FIG. 5) of the edgelet. The received 702 3D location for the edgelet and predicted pose of the edgelet may be input to a search direction engine 704 and a search range engine 706.

In some cases, the search direction engine 704 may determine a search direction for the edgelet, and the search range engine 706 may determine a search range for the edgelet. In some cases, as the tracking engine 700 may be used for both mature and immature edgelets, the search range may be relatively larger for immature edgelets and a relatively smaller search range for mature edgelets. The search direction for the edgelet and the search range for the edgelet may be passed to a NCC matching engine 708. The NCC matching engine 708 may also receive 710 a reference patch and a current image. In some cases, the reference patch may be a portion of the current image that may be determined based on the search direction, and search range. In some cases, the NCC matching engine 708 may receive a predicted location of every edgelet currently being tracked within the reference patch. For example, an edgelet may store the reference patch of the frame where the edgelet was detected along with the predicated location of the edgelet along with the estimated search direction used to perform the NCC matching in the current frame. In some cases, the reference patch may be slid (e.g., moved) along the search range in the search direction from a start of the search range to an end of the search range. The NCC matching engine 708 may match an edge associated with the estimated 3D location for the edgelet with a predicted location of the edgelet.

A gradient matching engine 712 may verify the matched edge and estimated 3D location by determining a direction of a gradient of the edge. In some cases, the gradient matching engine 712 may output the gradient direction. If the gradient matching engine 712 verifies the match, a subpixel tracking engine 714 may determine the location of the edgelet to subpixel accuracy. The tracked location of the edgelet and the gradient direction may be output 716 by the tracking engine 700.

Figure 8:
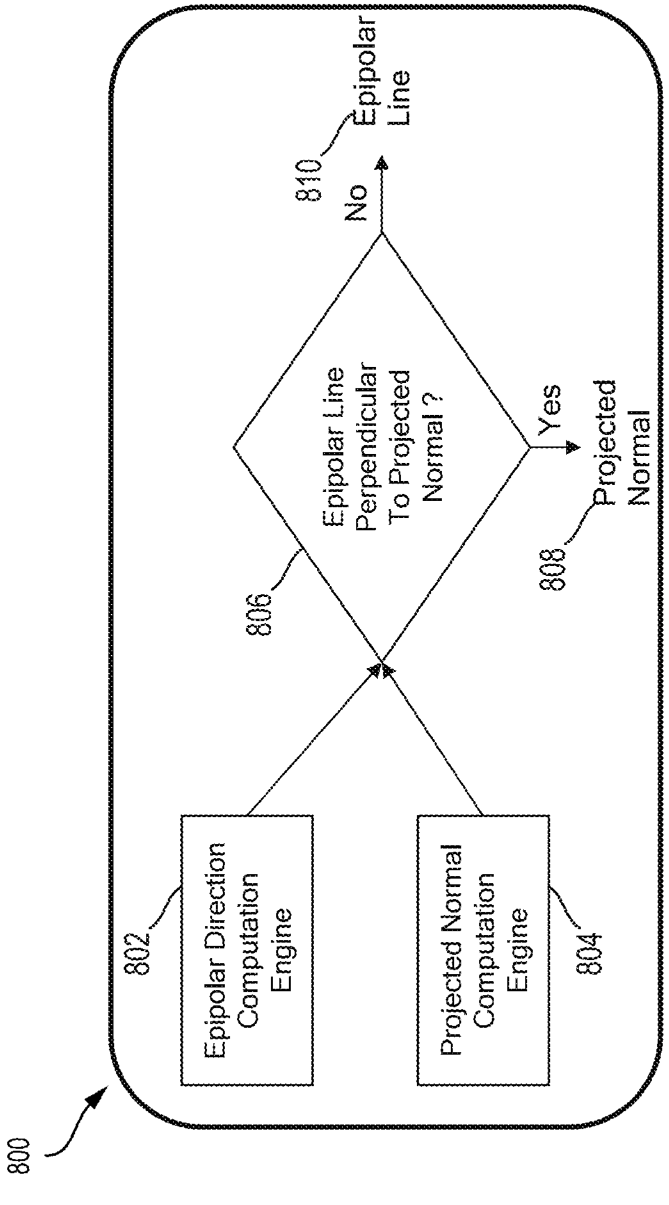
FIG. 8 is a block diagram illustrating a search direction engine, in accordance with aspects of the present disclosure.

FIG. 8 is a block diagram illustrating a search direction engine 800, in accordance with aspects of the present disclosure. In some cases, the search direction engine 800 may correspond to the search direction engine 704 of FIG. 7. In some cases, the search direction engine 800 may determine the search direction using two techniques. For example, an epipolar direction computation engine 802 may use an epipolar direction computation to determine the search direction, while a projected normal computation engine 804 may use a projected normal to determine the search direction. In some cases, the search direction is determined so that the search direction intersects the edge at a unique maxima and the search direction may not exactly match a detected edgelet, so long as the search direction includes the edge. In some cases, the epipolar direction computation may be performed by projecting a ray from a reference frame pixel location back to current frame using predicted pose of current frame. The projected ray may be called an epipolar direction, and this epipolar direction may be used as the search direction.

In some cases, the projected normal may be determined by computing a predicted location (P1) of an edge in current frame using the current frame's predicted location, a ray in reference frame (using reference frame pixel location), and an estimated depth. A second pixel location may be computed by moving along gradient direction from the reference pixel location. This second pixel location may be used to create second ray. The second ray along with estimate depth may be used to get a second predicted point (P2) in current image. A line joining P1 and P2 become a projected normal direction, which may be used as a search direction.

In some cases, the epipolar direction computation may result in a search direction that is exactly parallel to the edge direction and thus may not intersect the edge. In this case, it may be useful to revert to a projected normal direction. The epipolar direction computation may just depend on a predicted pose of the current frame whereas the projected normal depends on both a predicted pose and estimate depth and thus may be inaccurate for edgelets without a robust depth estimate. In some cases, an epipolar line determined by the epipolar direction computation engine 802 may be checked 806 to determine whether the epipolar line is perpendicular to a projected normal line generated by the projected normal computation engine 804. If the lines are perpendicular 808, then the projected normal line may be output as the search direction. If the lines are not perpendicular 810, then the epipolar line may be output as the search direction.

Figure 9:
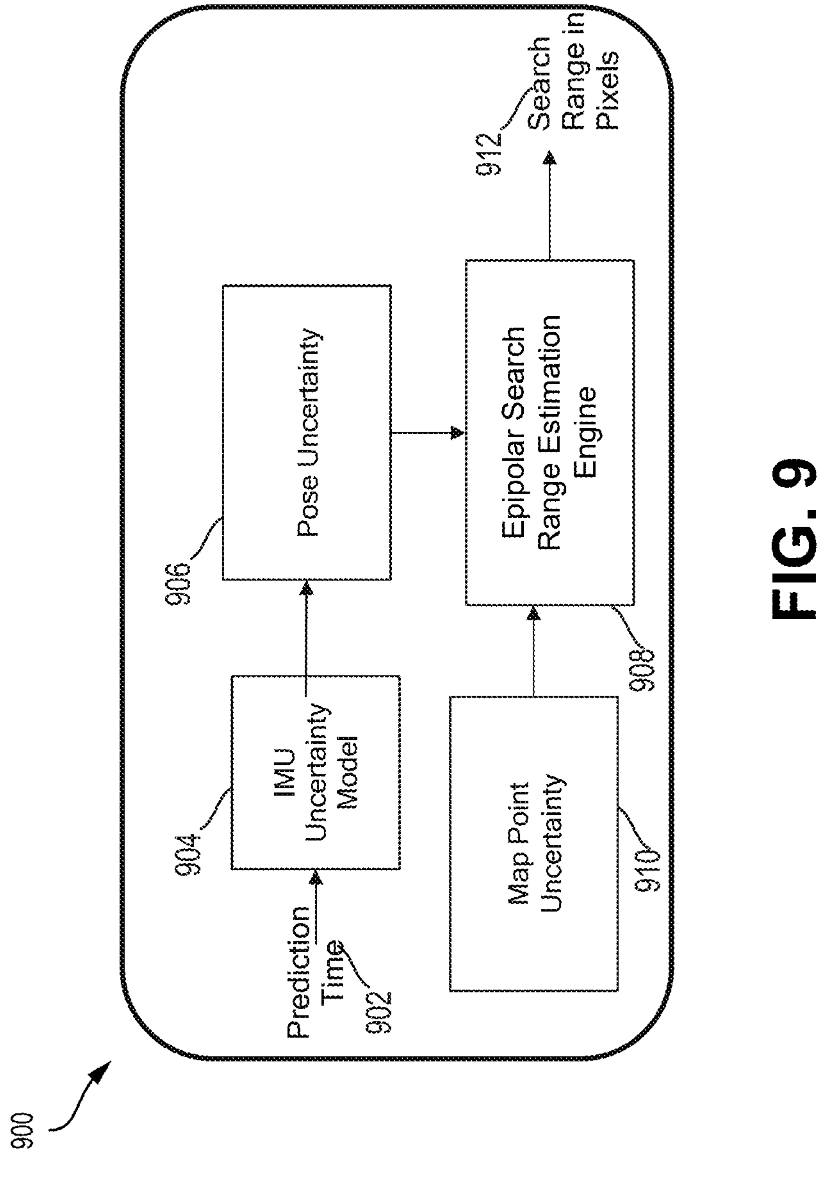
FIG. 9 is a block diagram illustrating a search range engine, in accordance with aspects of the present disclosure.

FIG. 9 is a block diagram illustrating a search range engine 900, in accordance with aspects of the present disclosure. The search range engine 900 may correspond to the search range engine 706 of FIG. 7. In FIG. 9, an amount of time 902 between a last time the pose of a device was determined and a current time (e.g., prediction time) may be provided to an IMU uncertainty model 904. In some cases, the more time between when a previous pose was determined and a current time, there may be a greater amount of noise/uncertainty in a predicted pose based on the IMU data. A larger amount of noise/uncertainty in the predicted pose may result in a larger search range, while a lower amount of noise/uncertainty in the predicted pose may result in a smaller search range. The IMU uncertainty model 904 may predict an amount of pose uncertainty 906 based on the amount of time 902. In some cases, the IMU uncertainty model 904 may be machine learning based and trained based on, for example, specific IMU hardware. The amount of pose uncertainty 906 may be passed into an epipolar search range estimation engine 908.

A map point uncertainty 910 may be an indication whether a particular edgelet is a mature edgelet or an immature edgelet. As indicated above, an immature edgelet may result in a larger search range, while a mature edgelet may result in a smaller search range. The map point uncertainty 910 may also be passed into an epipolar search range estimation engine 908. The epipolar search range estimation engine 908 may estimate a search range 912 based on a combination of the pose uncertainty 906 and the map point uncertainty 910. In some cases, the search range 912 may be a number pixels to search along the search direction.

Figure 10A:
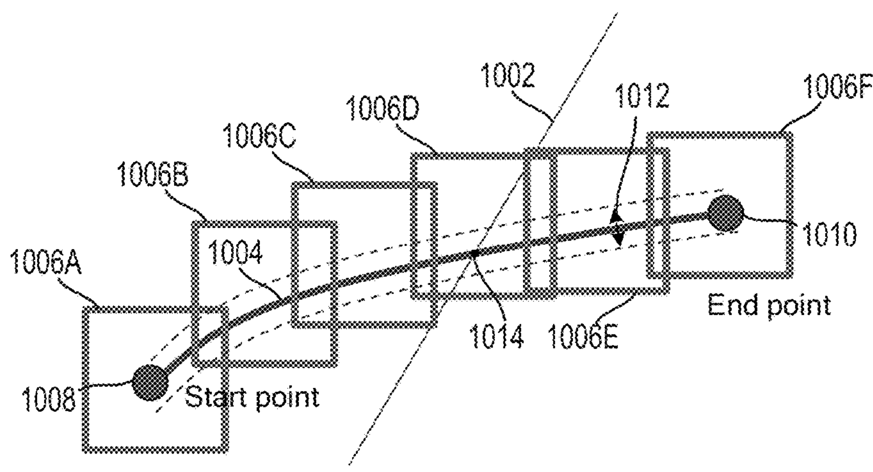
FIG. 10A illustrates a search direction with multiple references patches, in accordance with aspects of the present disclosure.

FIG. 10A illustrates a search direction with multiple references patches, in accordance with aspects of the present disclosure. In some cases, for an edge 1002, a search direction 1004 may be determined based on an epipolar line. For example, the epipolar line may take into account camera properties, such as lens distortion, and in some cases, these camera properties may cause a search direction 1004 to appear curved in an image. In some cases, multiple reference patches 1006A . . . 1006F (collectively, reference patches 1006) may be defined (e.g., overlaying the patch on the image so that the patch includes pixel values of the image where the patch is overlayed) from a beginning (e.g., start point 1008) of a search range to an end (e.g., end point 1010) of the search range. For example, a first reference patch 1006A may be defined based on the start point 1008 and after a local maxima has been found for the reference patch 1006A, the reference patch may be slid (e.g., moved) along the search direction 1004 to reference patch 1006B, and so forth until the end point 1010 has been reached.

In some cases, a band width 1012 may be a number of pixels around the search direction 1004 may also be searched. In some cases, the band width 1012 may be defined based on an amount of pose uncertainty (e.g., pose uncertainty 906 of FIG. 9). In some cases, a size of the reference patches 1006 may be configurable. In some cases, a width of the reference patches may be based on an amount of uncertainty in a depth of the edgelet. For example, references patches 1006 for immature edgelets may be larger as compared to mature edgelets.

In some cases, a search for the edge 1002 may be performed in the search direction 1004, (e.g., in a positive direction (start point 1008 to end point 1010) and/or negative direction (end point 1010 to start point 1008)), for the search range, for example, by a NCC matching engine (e.g., NCC matching engine 708 of FIG. 7). In some cases, NCC matching may be performed for pixels of a reference patch in the current image that are along the search direction and in the search range (e.g., pixels within the search range (e.g., between the start point 1008 and end point 1010) and band width 1012 along the search direction 1004). The NCC matching engine may determine a normalized cross correlation (e.g., sliding dot product or sliding inner product) to determine how similar a pixel being searched is to another pixel. In some cases, a NCC score may indicate how similar a pixel being searched is to another pixel. A local maxima of the NCC score for a reference patch may indicate a pixel that is most different from another pixel within the reference patch, and the local maxima may indicate where an edge is (e.g., a point on the edge (e.g., edgelet) where a gradient rapidly changes). In some cases, the NCC search may be performed for a number of reference patches (e.g., each reference patch) to determine a set of local maximas and a global maxima may be determined based on the local maximas. This global maxima may correspond to where the edge 1002 is located along the search direction 1004 (e.g., edgelet 1014).

Figure 10B:
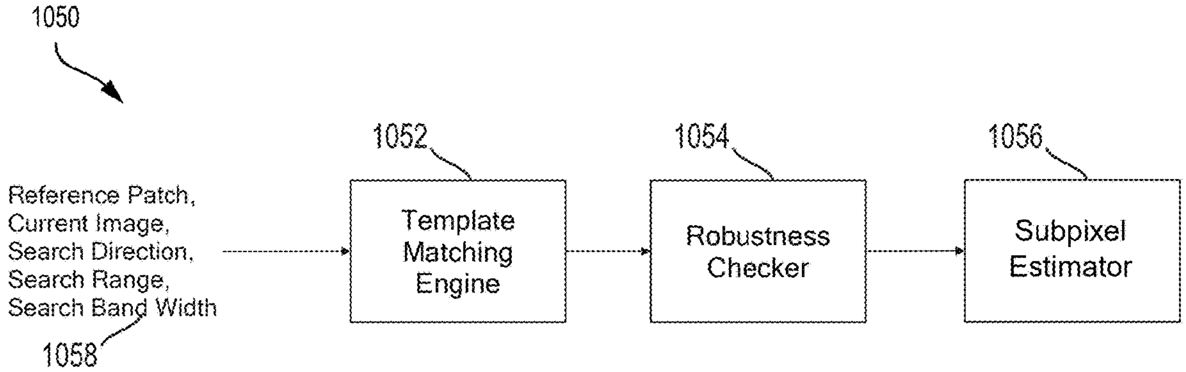
FIG. 10B is a block diagram illustrating a technique for a NCC matching engine, in accordance with aspects of the present disclosure.

In some cases, the NCC matching engine may be implemented in hardware. FIG. 10B is a block diagram illustrating a technique for a NCC matching engine 1050, in accordance with aspects of the present disclosure. In some cases, the NCC matching engine 1050 may be implemented hardware. As shown, the NCC matching engine 1050 may include a template matching engine 1052, a robustness checker 1054, and a subpixel estimator 1056. In some cases, a reference patch, current image, search direction, search range, and search bandwidth may be input 1058 to the template matching engine 1052. In some cases, the template matching engine 1052 may determine NCC scores for pixels within the search range and band width 1012 along the search direction 1004 within the reference patch. The template matching engine 1052 may return coordinates of a local maximum NCC score and the NCC score for the reference patch. In some cases, local maximum NCC scores may be determined for each reference patch and a global maximum NCC score may be determined based on the local maximum NCC scores. Alternatively, a size of the reference patch may be provided as a part of the input 1058, along with the current image, search direction, search range and search bandwidth and the template matching engine may slide a reference patch along the search direction and return coordinates of a global maximum NCC score.

In some cases, multiple global maximas may be returned. For example, the band width (e.g., band width 1012) may be sufficiently large that multiple pixels on the edge may within the search range/band width. These multiple pixels may have a same NCC score (or NCC scores within a certain threshold of each other) and multiple global maximas may be found. Where multiple global maximas are returned, the robustness checker 1054 may check the multiple global maximas for ambiguity. To check for ambiguity, the robustness checker 1054 may cluster the different global maximas. The robustness checker 1054 may cluster maximum NCC scores based on an inter-match distance (e.g., distance between the different coordinates of the global maximas). If there is a single cluster of global maximas, then there is no ambiguity and the robustness checker 1054 may determine that an edge has been found. If multiple clusters of global maximas are present, then there may be ambiguity and the robustness checker 1054 may determine that an edge has not been successfully found.

If an edge has been successfully found a subpixel estimator 1056 may estimate the location of the edge with subpixel accuracy. In some cases, the subpixel estimator 1056 may minimize error perpendicular to the edge based on a constrained optical flow equation. A regular optical flow equation may determine how to move a patch, such as the reference patch, such that the pixel intensities in the patch best match with pixel intensities in the image. In some cases, regular optical flow equations, such as $ul_x+vl_y=-l_t$ (where u represents a movement along an X axis, $l_x$ represents a gradient along the X axis, v represents a movement along a Y axis, $l_y$ represents a gradient along the Y axis, and $l_t$ represents an amount of intensity change), may not be useful for subpixel estimation along an edge. For example, pixels along the edge may have the same or similar NCC scores (e.g., $-l_t$ becomes 0 when moving perpendicular to the edge) and constraining an optical flow equation allows the optical flow subpixel detection to restrict subpixel correction along the direction of the edge.

The constraint may be expressed as $$\begin{pmatrix} u \\ v \end{pmatrix} = K\begin{pmatrix} \nabla X \\ \nabla Y \end{pmatrix},$$

where ∇X and ∇Y represent a gradient of the underlying edge, K represents a sub pixel correction along a gradient direction, where ∇X and ∇Y are estimates of the gradient, and such that $$\begin{pmatrix} u \\ v \end{pmatrix}$$

are parameterized based on ∇X and ∇Y so that the patch is not moved perpendicular to the edge. Applying the constraint to the optical flow equation yields the equation $(\nabla X l_x + — \nabla Y l_y)K = -l_t$. Stacking all of the optical flow constraints in a reference patch yields:

$$\begin{pmatrix} \nabla X_0 I_{x_1} + \nabla Y_0 I_{y_1} \\ \nabla X_0 I_{x_2} + \nabla Y_0 I_{y_2} \\ \nabla X_0 I_{x_3} + \nabla Y_0 I_{y_3} \\ \nabla X_0 I_{x_4} + \nabla Y_0 I_{y_4} \\ \vdots \\ \nabla X_0 I_{x_w} + \nabla Y_0 I_{y_w} \end{pmatrix} K = \begin{pmatrix} I_{t_1} \\ I_{t_2} \\ I_{t_3} \\ I_{t_4} \\ \vdots \\ I_{t_w} \end{pmatrix}$$

$$K = (A^T A)^{-1} A^T B,$$

and a subpixel match that minimizes error perpendicular to the edge may be expressed as $$\begin{pmatrix} x \\ y \end{pmatrix} = K(\overrightarrow{\begin{pmatrix} \nabla X \\ \nabla Y \end{pmatrix}}) + \begin{pmatrix} X_0 \\ Y_0 \end{pmatrix}.$$

In some cases, subpixel estimation may be performed by the subpixel estimator 1056 of FIG. 10A and/or the subpixel tracking engine 714 of FIG. 7.

Figure 11:
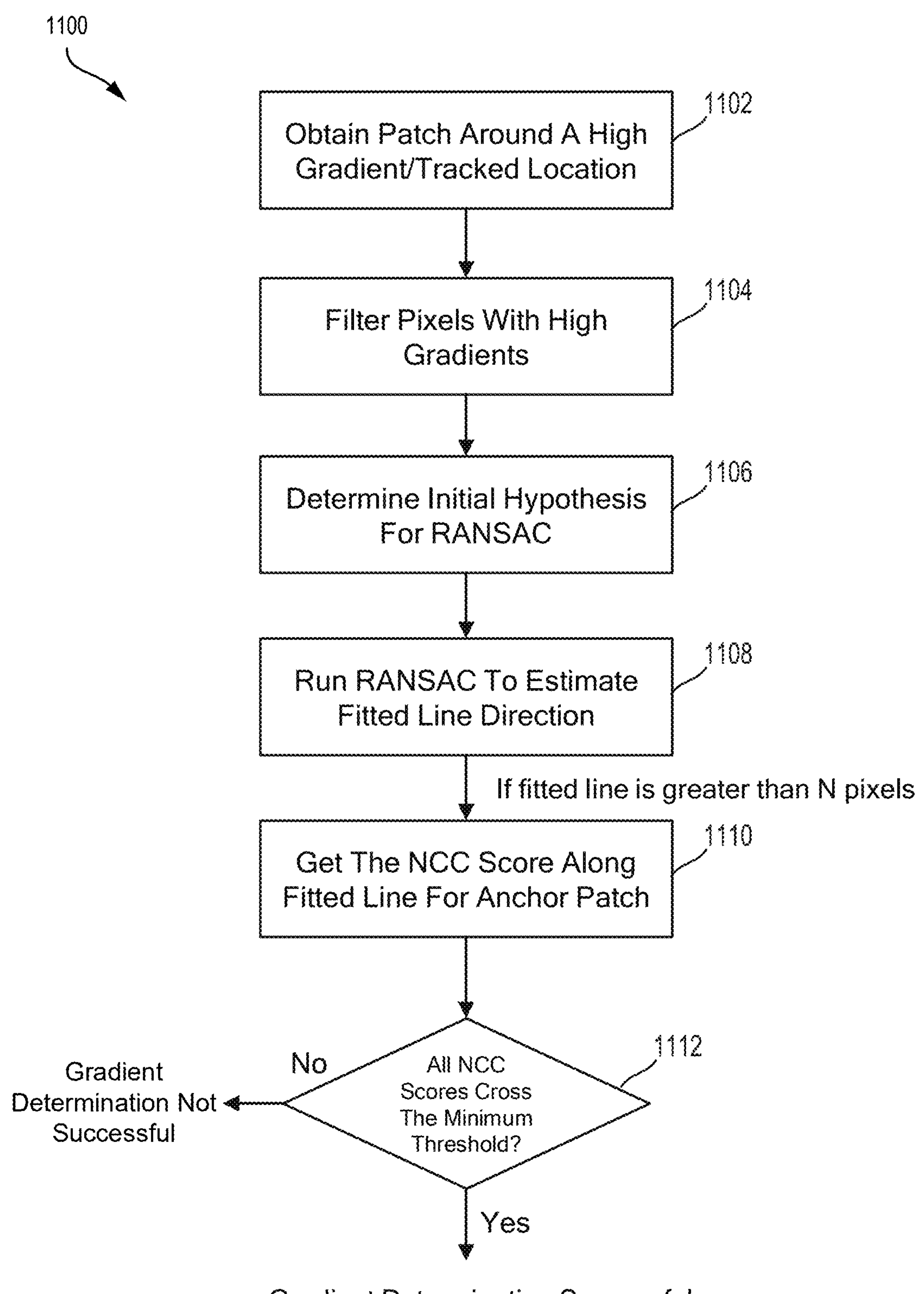
FIG. 11 is a flow diagram illustrating a technique for gradient direction estimation, in accordance with aspects of the present disclosure.

FIG. 11 is a flow diagram illustrating a technique for gradient direction estimation 1100, in accordance with aspects of the present disclosure. In some cases, the technique for gradient direction estimation 1100 may be performed by a gradient measurement engine 712 of FIG. 7. To estimate the gradient direction, a patch around a global maxima (e.g., a high gradient pixel) may be obtained 1102. In some cases, the patch may be 8×8 pixels. Pixels with a low gradient (e.g., pixels with a gradient magnitude lower than a threshold) within the patch may be filtered 1104. A line may be fitted to the remaining high gradient pixels. An initial hypothesis may be determined 1106 for random sample consensus (RANSAC). In some cases, the initial hypothesis may be a gradient direction at (0,0) (e.g., at the global maxima). The gradient direction may be a direction of the edge. RANSAC may be run 1108 to estimate a slope of the line, which corresponds to the edge direction for a line fitted to the high gradient pixels. In some cases, RANSAC may sample the intensities for the pixels of the patch to estimate a line. This line may correspond to the edge. For example, the line may be matched to the direction of the edge. The high gradient pixels which are <1 pixel from the line are considered inlier pixels. If the number of inliers pixels exceed a minimum threshold, then the line may be considered matched to the direction of the edge. The NCC scores for inlier pixels along the fitted line may be obtained 1110 for the patch and the NCC scores may be compared to a minimum threshold NCC score. If some of the NCC scores do not meet the minimum threshold NCC score, then a determination may be made that the gradient has not been successfully determined. If all of the NCC scores meet the minimum threshold NCC score, then a determination may be made that the gradient has been successfully determined and that the edge has been successfully detected. In some cases, the gradient direction of the edge may be output.

Figure 12:
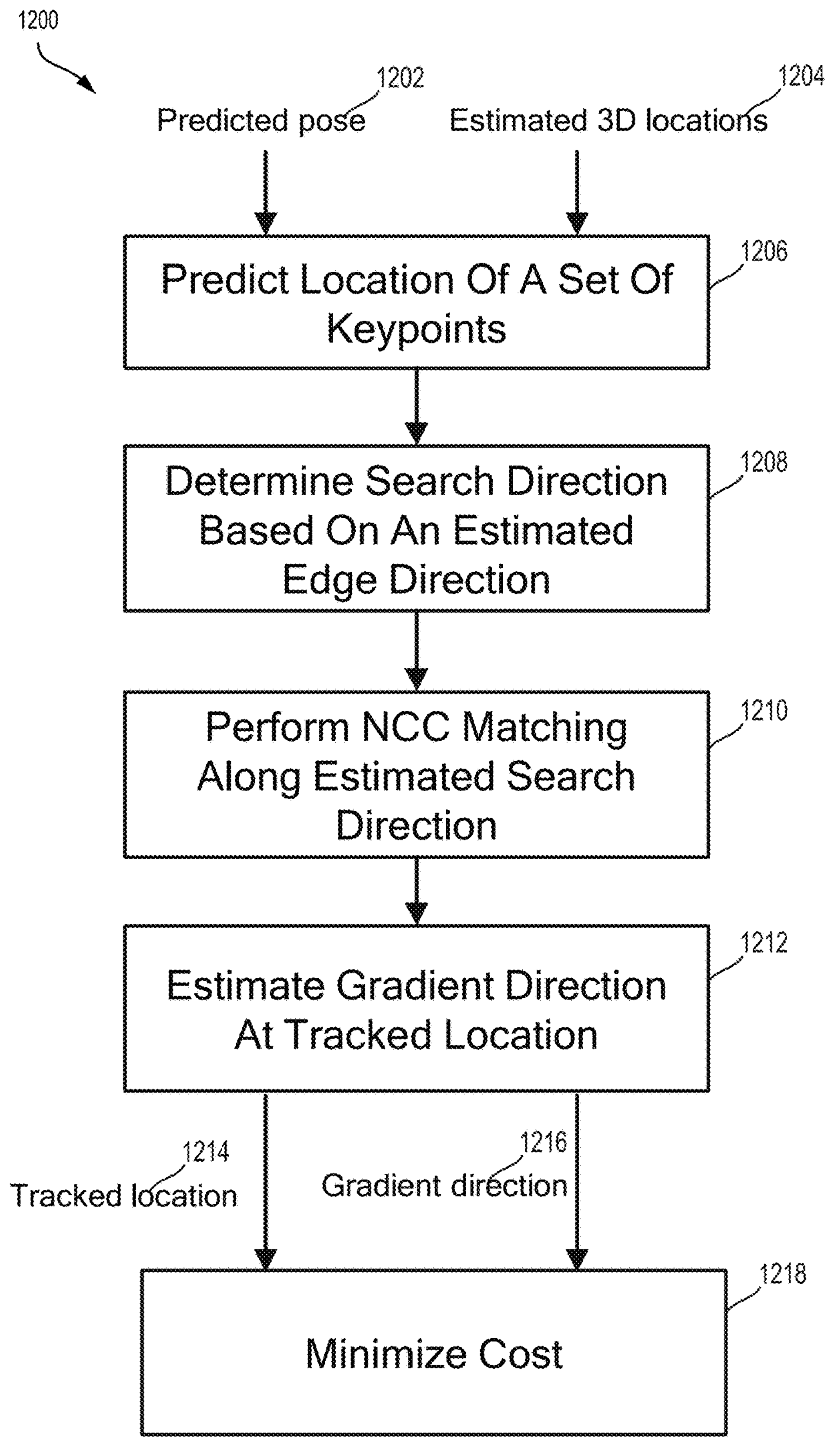
FIG. 12 illustrates a technique for parameterizing edgelets for locating and determining a gradient direction of edgelets, in accordance with aspects of the present disclosure.

FIG. 12 illustrates a technique for parameterizing edgelets for locating and determining a gradient direction of edgelets 1200, in accordance with aspects of the present disclosure. In some cases, it may be useful to use two points to track an edgelet rather than a single point. In some cases, two points may each have their own depth estimates that may allow for a more accurate search direction as the multiple depth estimates allow for an estimated edge direction in three dimensions. In some cases, a predicted pose 1202 and previously estimated 3D locations 1204 for a set of points (e.g., two or more points) may be received and a location of a set of keypoints may be predicted 1206. In some cases, the predicted pose 1202 and previously estimated 3D locations 1204 for a point of the set of points may be similar to the received 702 3D location for the edgelet and predicted pose of the edgelet as discussed above with respect to FIG. 7. In some cases, based on the location of the keypoints of the set of keypoints, an edge may be estimated. For example, a line may be estimated between a 3D location of a first keypoint and a 3D location of a second keypoint.

A search direction may be determined 1208 based on this estimated edge. For example, the search direction that is perpendicular to a direction of the estimated edge may be determined for each keypoint. NCC matching may be performed 1210 along the estimated search direction. In some cases, the NCC matching performed 1210 may be similar to the NCC matching as described above with respect to the NCC matching engine 708 of FIG. 7. A gradient direction may be estimated 1212 for the keypoints (e.g., tracked locations). In some cases, the gradient direction estimation may be performed in a manner similar to that described above with respect to the gradient matching engine 712 of FIG. 7. A tracked location 1214 and gradient direction 1216 may be output in a manner similar to output 716 as described above with respect to FIG. 7. In some cases, a cost minimizing function 1218 may be applied to the tracked location 1214 and gradient direction 1216. The cost minimizing function 1218 may solve a non-linear optimization where a current frame edgelet tracking reprojection error of all tracked edgelets act as constraint while an edgelet location and a current frame pose are variables.

Figure 13:
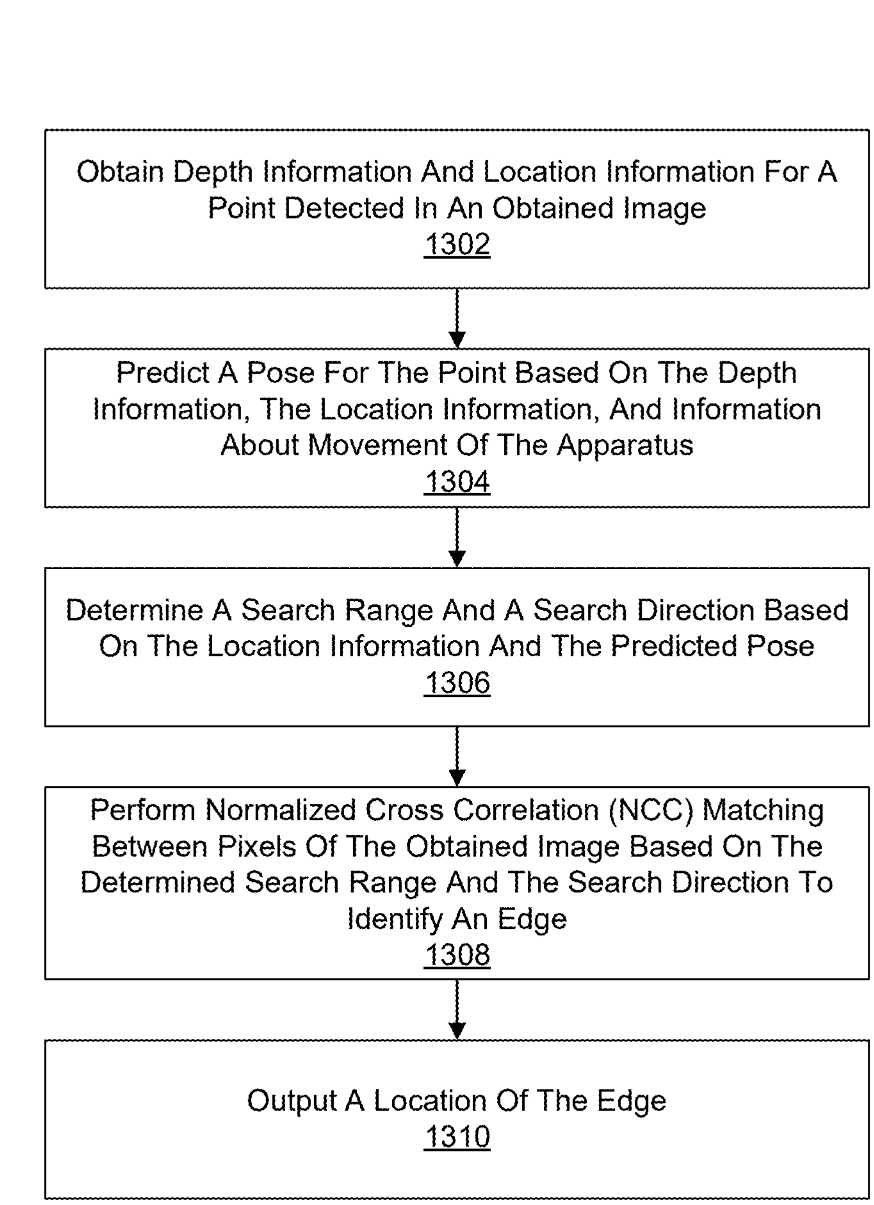
FIG. 13 is a flow diagram illustrating a process for edge detection, in accordance with aspects of the present disclosure.

FIG. 13 is a flow diagram illustrating a process 1300 for edge detection, in accordance with aspects of the present disclosure. The process 1300 may be performed by a computing device (or apparatus) or a component (e.g., a chipset, codec, etc.) of the computing device (e.g., image capture and processing system 100, of FIG. 1, XR system 200 of FIG. 2, computing system 1400 of FIG. 14, etc.). The computing device may be a mobile device (e.g., a mobile phone), a network-connected wearable such as a watch, an extended reality (XR) device such as a virtual reality (VR) device or augmented reality (AR) device, a vehicle or component or system of a vehicle, or other type of computing device. The operations of the process 1300 may be implemented as software components that are executed and run on one or more processors (e.g., image processor 150, host processor 152 of FIG. 1, compute components 210 of FIG. 2, processor 1410 of FIG. 14, etc.).

At block 1302, the computing device (or component thereof) may obtain a depth information and location information for a point detected in an obtained image. In some cases, an edgelet may be marked as a mature edgelet when depth information for the edgelet is available, and the edgelet may be an immature edgelet where there is no depth information available. In some examples, the depth information may update a placeholder depth (e.g., for an immature edgelet). In some cases, the computing device (or component thereof) may determine the depth information based on a second image, wherein the second image includes a view of the point. In some examples, the computing device (or component thereof) may obtain depth information and location information for a second point detected in the obtained image; estimate a second edge based on the location information for the second point and the location information for the point; and determine the search range and the search direction based on the second edge.

At block 1304, the computing device (or component thereof) may predict a pose for the point based on the depth information, location information, and information about movement of the apparatus. For example, a pose predictor 516 of FIG. 5 may predict a pose of a mature edgelet. In some cases, the information about movement of the apparatus comprises information from an internal measurement unit (IMU) (e.g., based on accelerometer 204 of FIG. 2, gyroscope 206 of FIG. 2, etc.) of the apparatus.

At block 1306, the computing device (or component thereof) may determine a search range (e.g., search range 624 of FIG. 6) and a search direction (e.g., search direction 622 of FIG. 6) based on the location information and predicted pose. In some cases, the search direction comprises at least one of an epipolar direction or a projected normal direction. In some examples, the search range is determined based on uncertainty in the information from the IMU.

At block 1308, the computing device (or component thereof) may perform normalized cross correlation (NCC) matching between pixels of the obtained image based on the determined search range and search direction to identify an edge. For example, an NCC matching engine 708 of FIG. 7 may be used to slide a portion of an image along the search range in the search direction from a start of the search range to an end of the search range. In some cases, the computing device (or component thereof) may estimate the location of the edge with subpixel accuracy using a constrained optical flow equation to restrict correction along a direction of the edge. For example, if an edge has been successfully found a subpixel estimator 1056 of FIG. 10 may estimate the location of the edge with subpixel accuracy. In some examples, the computing device (or component thereof) may estimate the direction of the edge; obtain a patch of the obtained image based on the edge; fit a line to the patch; and determine that the line matches an estimated direction of the edge to verify the edge. For example, a patch around a global maxima may be obtained and random sample consensus (RANSAC) may be run to estimate a direction for the line fitted to the edge. In some cases, RANSAC may sample the intensities for the pixels of the patch to estimate a line and if the line matches to the direction of the edge within a certain threshold, then the line may be determined to match the direction of the edge. In some examples, the computing device (or component thereof) may determine a size of a reference patch for the obtained image based on uncertainty in the depth information; overlay the reference patch on the obtained image based on the search range and the search direction; and perform NCC matching between pixels within the reference patch. In some cases, the computing device (or component thereof) may slide the reference patch along the search range based on the search direction.

At block 1310, the computing device (or component thereof) may output a location of the edge.

As noted herein, the techniques or processes described herein (e.g., the process 1300) may be performed by a computing device, an apparatus, and/or any other computing device. In some cases, the computing device or apparatus may include a processor, microprocessor, microcomputer, or other component of a device that is configured to carry out the steps of processes described herein. In some examples, the computing device or apparatus may include a camera configured to capture video data (e.g., a video sequence) including video frames. For example, the computing device may include a camera device, which may or may not include a video codec. As another example, the computing device may include a mobile device with a camera (e.g., a camera device such as a digital camera, an IP camera or the like, a mobile phone or tablet including a camera, or other type of device with a camera). In some cases, the computing device may include a display for displaying images. In some examples, a camera or other capture device that captures the video data is separate from the computing device, in which case the computing device receives the captured video data. The computing device may further include a network interface, transceiver, and/or transmitter configured to communicate the video data. The network interface, transceiver, and/or transmitter may be configured to communicate Internet Protocol (IP) based data or other network data.

The processes described herein can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

In some cases, the devices or apparatuses configured to perform the operations of the process 1300 and/or other processes described herein may include a processor, microprocessor, micro-computer, or other component of a device that is configured to carry out the steps of the process 1300 and/or other process. In some examples, such devices or apparatuses may include one or more sensors configured to capture image data and/or other sensor measurements. In some examples, such computing device or apparatus may include one or more sensors and/or a camera configured to capture one or more images or videos. In some cases, such device or apparatus may include a display for displaying images. In some examples, the one or more sensors and/or camera are separate from the device or apparatus, in which case the device or apparatus receives the sensed data. Such device or apparatus may further include a network interface configured to communicate data.

The components of the device or apparatus configured to carry out one or more operations of the process 1300 and/or other processes described herein can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The process 1300 is illustrated as a logical flow diagram, the operations of which represent sequences of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein (e.g., the process 1300 and/or other processes) may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program including a plurality of instructions executable by one or more processors. The computer-readable or machine-readable storage medium may be non-transitory.

Additionally, the processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 14 is a diagram illustrating an example of a system for implementing certain aspects of the present technology. In particular, FIG. 14 illustrates an example of computing system 1400, which can be for example any computing device making up internal computing system, a remote computing system, a camera, or any component thereof in which the components of the system are in communication with each other using connection 1405. Connection 1405 can be a physical connection using a bus, or a direct connection into processor 1410, such as in a chipset architecture. Connection 1405 can also be a virtual connection, networked connection, or logical connection.

In some examples, computing system 1400 is a distributed system in which the functions described in this disclosure can be distributed within a datacenter, multiple data centers, a peer network, etc. In some examples, one or more of the described system components represents many such components each performing some or all of the functions for which the component is described. In some cases, the components can be physical or virtual devices.

Example system 1400 includes at least one processing unit (CPU or processor) 1410 and connection 1405 that couples various system components including system memory 1415, such as read-only memory (ROM) 1420 and random access memory (RAM) 1425 to processor 1410. Computing system 1400 can include a cache 1412 of high-speed memory connected directly with, in close proximity to, or integrated as part of processor 1410.

Processor 1410 can include any general purpose processor and a hardware service or software service, such as services 1432, 1434, and 1436 stored in storage device 1430, configured to control processor 1410 as well as a special-purpose processor where software instructions are incorporated into the actual processor design. Processor 1410 may be a completely self-contained computing system, containing multiple cores or processors, a bus, memory controller, cache, etc. A multi-core processor may be symmetric or asymmetric.

To enable user interaction, computing system 1400 includes an input device 1445, which can represent any number of input mechanisms, such as a microphone for speech, a touch-sensitive screen for gesture or graphical input, keyboard, mouse, motion input, speech, camera, accelerometers, gyroscopes, etc. Computing system 1400 can also include output device 1435, which can be one or more of a number of output mechanisms. In some instances, multimodal systems can enable a user to provide multiple types of input/output to communicate with computing system 1400. Computing system 1400 can include communications interface 1440, which can generally govern and manage the user input and system output. The communication interface may perform or facilitate receipt and/or transmission of wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1440 may also include one or more Global Navigation Satellite System (GNSS) receivers or transceivers that are used to determine a location of the computing system 1400 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1430 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1430 can include software services, servers, services, etc., that when the code that defines such software is executed by the processor 1410, it causes the system to perform a function. In some examples, a hardware service that performs a particular function can include the software component stored in a computer-readable medium in connection with the necessary hardware components, such as processor 1410, connection 1405, output device 1435, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some examples, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the examples provided herein. However, it will be understood by one of ordinary skill in the art that the examples may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples.

Individual examples may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific examples thereof, but those skilled in the art will recognize that the application is not limited thereto. Thus, while illustrative examples of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, examples can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate examples, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the present disclosure include:

Aspect 1. An apparatus for edge detection, comprising: at least one memory; and at least one processor coupled to the at least one memory and configured to: obtain a depth information and location information for a point detected in an obtained image; predict a pose for the point based on the depth information, location information, and information about movement of the apparatus; determine a search range and a search direction based on the location information and predicted pose; perform normalized cross correlation (NCC) matching between pixels of the obtained image based on the determined search range and search direction to identify an edge; and output a location of the edge.

Aspect 2. The apparatus of Aspect 1, wherein the at least one processor is further configured to estimate the location of the edge with subpixel accuracy using a constrained optical flow equation to restrict correction along a direction of the edge.

Aspect 3. The apparatus of any of Aspects 1-2, wherein the at least one processor is configured to: estimate a direction of the edge; obtain a patch of the obtained image based on the edge; fit a line to the patch; and determine that the line matches an estimated direction of the edge to verify the edge.

Aspect 4. The apparatus of any of Aspects 1-3, wherein the search direction comprises at least one of an epipolar direction or a projected normal direction.

Aspect 5. The apparatus of any of Aspects 1-4, wherein the information about movement of the apparatus comprises information from an internal measurement unit (IMU) of the apparatus.

Aspect 6. The apparatus of Aspect 5, wherein the search range is determined based on uncertainty in the information from the IMU.

Aspect 7. The apparatus of any of Aspects 1-6, wherein the at least one processor is configured to: determine a size of a reference patch for the obtained image based on uncertainty in the depth information; overlay the reference patch on the obtained image based on the search range and the search direction; and perform NCC matching between pixels within the reference patch.

Aspect 8. The apparatus of Aspect 7, wherein the at least one processor is configured to slide the reference patch along the search range based on the search direction.

Aspect 9. The apparatus of any of Aspects 1-8, wherein the at least one processor is configured to determine the depth information based on a second image, wherein the second image includes a view of the point.

Aspect 10. The apparatus of any of Aspects 1-9, wherein the at least one processor is configured to: obtain depth information and location information for a second point detected in the obtained image; estimate a second edge based on the location information for the second point and the location information for the point; and determine the search range and the search direction based on the second edge.

Aspect 11. A method for edge detection, comprising: obtaining a depth information and location information for a point detected in an obtained image; predicting a pose for the point based on the depth information, location information, and information about movement of a device; determining a search range and a search direction based on the location information and predicted pose; performing normalized cross correlation (NCC) matching between pixels of the obtained image based on the determined search range and search direction to identify an edge; and outputting a location of the edge.

Aspect 12. The method of Aspect 11, further comprising estimating the location of the edge with subpixel accuracy using a constrained optical flow equation to restrict correction along a direction of the edge.

Aspect 13. The method of any of Aspects 11-12, further comprising: estimating a direction of the edge; obtaining a patch of the obtained image based on the edge; fitting a line to the patch; and determining that the line matches an estimated direction of the edge to verify the edge.

Aspect 14. The method of any of Aspects 11-13, wherein the search direction comprises at least one of an epipolar direction or a projected normal direction.

Aspect 15. The method of any of Aspects 11-14, wherein the information about movement of the device comprises information from an internal measurement unit (IMU) of the device.

Aspect 16. The method of Aspect 15, wherein the search range is determined based on uncertainty in the information from the IMU.

Aspect 17. The method of any of Aspects 11-16, further comprising: determining a size of a reference patch for the obtained image based on uncertainty in the depth information; overlaying the reference patch on the obtained image based on the search range and the search direction; and performing NCC matching between pixels within the reference patch.

Aspect 18. The method of Aspect 17, further comprising sliding the reference patch along the search range based on the search direction.

Aspect 19. The method of any of Aspects 11-18, further comprising determining the depth information based on a second image, wherein the second image includes a view of the point.

Aspect 20. The method of any of Aspects 11-19, further comprising obtaining depth information and location information for a second point detected in the obtained image; estimating a second edge based on the location information for the second point and the location information for the point; and determining the search range and the search direction based on the second edge.

Aspect 21. A non-transitory computer-readable medium having stored thereon instructions that, when executed by at least one processor, cause the at least one processor to perform one or more operations according to any of Aspects 11-20.

Aspect 26: An apparatus for edge detection, comprising means for performing one or more of operations according to any of Aspects 11 to 20.

What is claimed is:

1. An apparatus for edge detection, comprising:

at least one memory; and at least one processor coupled to the at least one memory and configured to:

obtain depth information and location information for a point detected in an obtained image;

predict a pose for the point based on the depth information, the location information, and information about movement of the apparatus;

determine a search range and a search direction based on the location information and the predicted pose;

determine a size of a reference patch for the obtained image based on uncertainty in the depth information;

overlay the reference patch on the obtained image based on the search range and the search direction;

perform normalized cross correlation (NCC) matching between pixels within the reference patch of the obtained image based on the determined search range and the search direction to identify an edge; and output a location of the edge.

2. The apparatus of claim 1, wherein the at least one processor is further configured to estimate the location of the edge with subpixel accuracy using a constrained optical flow equation to restrict correction along a direction of the edge.

3. The apparatus of claim 1, wherein the at least one processor is configured to:

estimate a direction of the edge;

obtain a patch of the obtained image based on the edge;

fit a line to the patch; and determine that the line matches an estimated direction of the edge to verify the edge.

4. The apparatus of claim 1, wherein the search direction comprises at least one of an epipolar direction or a projected normal direction.

5. The apparatus of claim 1, wherein the information about movement of the apparatus comprises information from an internal measurement unit (IMU) of the apparatus.

6. The apparatus of claim 5, wherein the search range is determined based on uncertainty in the information from the IMU.

7. The apparatus of claim 1, wherein the at least one processor is configured to slide the reference patch along the search range based on the search direction.

8. The apparatus of claim 1, wherein the at least one processor is configured to determine the depth information based on a second image, wherein the second image includes a view of the point.

9. The apparatus of claim 1, wherein the at least one processor is configured to:

obtain depth information and location information for a second point detected in the obtained image;

estimate a second edge based on the location information for the second point and the location information for the point; and determine the search range and the search direction based on the second edge.

10. A method for edge detection, comprising:

obtaining depth information and location information for a point detected in an obtained image;

predicting a pose for the point based on the depth information, the location information, and information about movement of a device;

determining a search range and a search direction based on the location information and the predicted pose;

determining a size of a reference patch for the obtained image based on uncertainty in the depth information;

overlaying the reference patch on the obtained image based on the search range and the search direction;

performing normalized cross correlation (NCC) matching between pixels within the reference patch of the obtained image based on the determined search range and the search direction to identify an edge; and outputting a location of the edge.

11. The method of claim 10, further comprising estimating the location of the edge with subpixel accuracy using a constrained optical flow equation to restrict correction along a direction of the edge.

12. The method of claim 10, further comprising:

estimating a direction of the edge;

obtaining a patch of the obtained image based on the edge;

fitting a line to the patch; and determining that the line matches an estimated direction of the edge to verify the edge.

13. The method of claim 10, wherein the search direction comprises at least one of an epipolar direction or a projected normal direction.

14. The method of claim 10, wherein the information about movement of the device comprises information from an internal measurement unit (IMU) of the device.

15. The method of claim 14, wherein the search range is determined based on uncertainty in the information from the IMU.

16. The method of claim 10, further comprising sliding the reference patch along the search range based on the search direction.

17. The method of claim 10, further comprising determining the depth information based on a second image, wherein the second image includes a view of the point.

18. The method of claim 10, further comprising:
- obtaining depth information and location information for a second point detected in the obtained image;
- estimating a second edge based on the location information for the second point and the location information for the point; and
- determining the search range and the search direction based on the second edge.

19. A non-transitory computer-readable medium having stored thereon instructions that, when executed by at least one processor, cause the at least one processor to:
- obtain depth information and location information for a point detected in an obtained image;
- predict a pose for the point based on the depth information, the location information, and information about movement of a device;
- determine a search range and a search direction based on the location information and the predicted pose;
- determine a size of a reference patch for the obtained image based on uncertainty in the depth information;
- overlay the reference patch on the obtained image based on the search range and the search direction;
- perform normalized cross correlation (NCC) matching between pixels within the reference patch of the obtained image based on the determined search range and the search direction to identify an edge; and
- output a location of the edge.

* * * * *